(12) United States Patent
Mizushima

(10) Patent No.: US 8,151,060 B2
(45) Date of Patent: Apr. 3, 2012

(54) SEMICONDUCTOR MEMORY SYSTEM HAVING A SNAPSHOT FUNCTION

(75) Inventor: Nagamasa Mizushima, Machida (JP)

(73) Assignee: Hitachi, Ltd., Tokyo (JP)

( * ) Notice: Subject to any disclaimer, the term of this patent is extended or adjusted under 35 U.S.C. 154(b) by 666 days.

(21) Appl. No.: 11/783,364

(22) Filed: Apr. 9, 2007

(65) Prior Publication Data

US 2008/0126712 A1 May 29, 2008

(30) Foreign Application Priority Data

Nov. 28, 2006 (JP) ................................. 2006-320240
Feb. 16, 2007 (JP) ................................. 2007-036236

(51) Int. Cl.
*G06F 12/00* (2006.01)
*G06F 11/00* (2006.01)
*G11C 16/02* (2006.01)

(52) U.S. Cl. . 711/141; 711/103; 711/202; 711/E21.022; 714/6.11; 714/15; 714/E11.084

(58) Field of Classification Search .................. 711/154; 395/430

See application file for complete search history.

(56) References Cited

U.S. PATENT DOCUMENTS

| | | | |
|---|---|---|---|
| 5,479,638 A * | 12/1995 | Assar et al. ................... | 711/103 |
| 5,835,953 A * | 11/1998 | Ohran ........................... | 711/162 |
| 5,930,833 A * | 7/1999 | Yoshioka et al. ............. | 711/210 |
| 6,052,799 A | 4/2000 | Li et al. | |
| 6,205,450 B1 | 3/2001 | Kanome | |
| 6,721,843 B1 | 4/2004 | Estakhri | |
| 7,237,080 B2 * | 6/2007 | Green et al. ................... | 711/162 |
| 7,240,172 B2 * | 7/2007 | Chong et al. ................... | 711/162 |
| 7,243,186 B2 * | 7/2007 | Liang et al. .................... | 711/103 |
| 7,334,098 B1 * | 2/2008 | Poston ........................... | 711/162 |
| 2002/0194438 A1 * | 12/2002 | Lasser ............................ | 711/153 |
| 2004/0210708 A1 * | 10/2004 | Conley .......................... | 711/103 |
| 2004/0260873 A1 | 12/2004 | Watanabe | |
| 2005/0144358 A1 * | 6/2005 | Conley et al. ................. | 711/103 |
| 2005/0182892 A1 * | 8/2005 | Nakanishi et al. ............. | 711/103 |
| 2007/0115738 A1 * | 5/2007 | Emaru et al. ................... | 365/203 |
| 2009/0228743 A1 * | 9/2009 | Ponnuswamy ................. | 714/48 |

FOREIGN PATENT DOCUMENTS

| | | |
|---|---|---|
| JP | 11-134117 | 5/1999 |
| JP | 2004-511030 | 4/2004 |

OTHER PUBLICATIONS

Thean, Aaron and Leburton, Jean-Pierre. "Flash memory: towards single-electronics." IEEE Potentials, Oct./Nov. 2002, pp. 35-41.*
Partial European Search Report mailed Jun. 15, 2009.

* cited by examiner

*Primary Examiner* — Reginald Bragdon
*Assistant Examiner* — Daniel Bernard
(74) *Attorney, Agent, or Firm* — Foley & Lardner LLP

(57) ABSTRACT

In a semiconductor memory computer equipped with a flash memory, use of backed-up data is enabled. The semiconductor memory computer includes an address conversion table for detecting physical addresses of at least two pages storing data by designating a logical address from one of logical addresses to be designated by a reading request. The semiconductor memory computer includes a page status register for detecting one page status allocated to each page, and page statuses to be detected include the at least following four statuses: (1) a latest data storage status, (2) a not latest data storage status, (3) an invalid data storage status, and (4) an unwritten status. By using the address conversion table and the page status register, at least two data s (latest data and past data) can be read for one designated logical address from a host computer.

18 Claims, 10 Drawing Sheets

| | X | Y | Z |
|---|---|---|---|
| 0 | A | | |
| 1 | B | | |
| 2 | C | | |
| 3 | D | | |

ADDRESS CONVERSION TABLE (1031)

| LA | FIRST PA | SECOND PA | THIRD PA |
|---|---|---|---|
| 0 | X0 | | |
| 1 | X1 | | |
| 2 | X2 | | |
| 3 | X3 | | |

PAGE STATUS REGISTER (1032)

| | STATUS |
|---|---|
| X | 0000 |
| Y | FFFF |
| Z | FFFF |

SNAPSHOT FLAG (1033)

| | |
|---|---|
| 1 | OFF |
| 2 | OFF |
| 3 | OFF |

FIG. 6B

| | X | Y | Z |
|---|---|---|---|
| 0 | A̸ | A' | |
| 1 | B̸ | B' | |
| 2 | C | | |
| 3 | D | | |

| LA | FIRST PA | SECOND PA | THIRD PA |
|---|---|---|---|
| 0 | Y0 | | |
| 1 | Y1 | | |
| 2 | X2 | | |
| 3 | X3 | | |

| | STATUS |
|---|---|
| X | 8800 |
| Y | 00FF |
| Z | FFFF |

| | |
|---|---|
| 1 | OFF |
| 2 | OFF |
| 3 | OFF |

FIG. 6C

| | X | Y | Z |
|---|---|---|---|
| 0 | A̸ | A' | |
| 1 | B̸ | B' | |
| 2 | (C) | C' | |
| 3 | (D) | D' | |

| LA | FIRST PA | SECOND PA | THIRD PA |
|---|---|---|---|
| 0 | Y0 | Y0 | |
| 1 | Y1 | Y1 | |
| 2 | Y2 | X2 | |
| 3 | Y3 | X3 | |

| | STATUS |
|---|---|
| X | 8800 |
| Y | 0000 |
| Z | FFFF |

| | |
|---|---|
| 1 | ON |
| 2 | OFF |
| 3 | OFF |

FIG. 6D

| | X | Y | Z |
|---|---|---|---|
| 0 | A̸ | A' | D" |
| 1 | B̸ | B' | |
| 2 | (C) | C' | |
| 3 | (D) | (D') | |

| LA | FIRST PA | SECOND PA | THIRD PA |
|---|---|---|---|
| 0 | Y0 | Y0 | Y0 |
| 1 | Y1 | Y1 | Y1 |
| 2 | Y2 | X2 | Y2 |
| 3 | Z0 | X3 | Y3 |

| | STATUS |
|---|---|
| X | 8800 |
| Y | 0000 |
| Z | 0FFF |

| | |
|---|---|
| 1 | ON |
| 2 | ON |
| 3 | OFF |

FIG. 6E

| | X | Y | Z |
|---|---|---|---|
| 0 | A̸ | A' | D" |
| 1 | B̸ | B' | (C) |
| 2 | (C̸) | C' | (D) |
| 3 | (D̸) | (D') | |

| LA | FIRST PA | SECOND PA | THIRD PA |
|---|---|---|---|
| 0 | Y0 | Y0 | Y0 |
| 1 | Y1 | Y1 | Y1 |
| 2 | Y2 | Z1 | Y2 |
| 3 | Z0 | Z2 | Y3 |

| | STATUS |
|---|---|
| X | 8888 |
| Y | 0000 |
| Z | 000F |

| | |
|---|---|
| 1 | ON |
| 2 | ON |
| 3 | OFF |

FIG. 7A

| | 2000 X | 2010 Y | 2020 Z |
|---|---|---|---|
| 0 | | A' | D" |
| 1 | | B' | (C) |
| 2 | | C' | (D) |
| 3 | | | (D') |

ADDRESS CONVERSION TABLE 1031

| LA | FIRST PA | SECOND PA | THIRD PA |
|---|---|---|---|
| 0 | Y0 | Y0 | Y0 |
| 1 | Y1 | Y1 | Y1 |
| 2 | Y2 | Z1 | Y2 |
| 3 | Z0 | Z2 | Y3 |

PAGE STATUS REGISTER 1032

| | STATUS |
|---|---|
| X | FFFF |
| Y | 0000 |
| Z | 000F |

SNAPSHOT FLAG 1033

| 1 | ON |
|---|---|
| 2 | ON |
| 3 | OFF |

FIG. 7B

| | X | Y | Z |
|---|---|---|---|
| 0 | | A' | D" |
| 1 | | B' | (C) |
| 2 | | C' | (D) |
| 3 | | (D') | |

| LA | FIRST PA | SECOND PA | THIRD PA |
|---|---|---|---|
| 0 | Y0 | Y0 | |
| 1 | Y1 | Y1 | |
| 2 | Y2 | Z1 | |
| 3 | Z0 | Z2 | |

| | STATUS |
|---|---|
| X | FFFF |
| Y | 0008 |
| Z | 000F |

| 1 | ON |
|---|---|
| 2 | OFF |
| 3 | OFF |

FIG. 7C

| | X | Y | Z |
|---|---|---|---|
| 0 | | A' | D" |
| 1 | | B' | (C) |
| 2 | | C' | (D) |
| 3 | | (D') | C" |

| LA | FIRST PA | SECOND PA | THIRD PA |
|---|---|---|---|
| 0 | Y0 | Y0 | |
| 1 | Y1 | Y1 | |
| 2 | Z3 | Z1 | |
| 3 | Z0 | Z2 | |

| | STATUS |
|---|---|
| X | FFFF |
| Y | 0088 |
| Z | 0000 |

| 1 | ON |
|---|---|
| 2 | OFF |
| 3 | OFF |

FIG. 7D

| | X | Y | Z |
|---|---|---|---|
| 0 | | A' | D" |
| 1 | | B' | (C) |
| 2 | | C' | (D) |
| 3 | | (D') | C" |

| LA | FIRST PA | SECOND PA | THIRD PA |
|---|---|---|---|
| 0 | Y0 | | |
| 1 | Y1 | | |
| 2 | Z3 | | |
| 3 | Z0 | | |

| | STATUS |
|---|---|
| X | FFFF |
| Y | 0088 |
| Z | 0880 |

| 1 | OFF |
|---|---|
| 2 | OFF |
| 3 | OFF |

FIG. 7E

| | X | Y | Z |
|---|---|---|---|
| 0 | D''' | A' | D" |
| 1 | | B' | (C) |
| 2 | | C' | (D) |
| 3 | | (D') | C" |

| LA | FIRST PA | SECOND PA | THIRD PA |
|---|---|---|---|
| 0 | Y0 | | |
| 1 | Y1 | | |
| 2 | Z3 | | |
| 3 | X0 | | |

| | STATUS |
|---|---|
| X | 0FFF |
| Y | 0088 |
| Z | 8880 |

| 1 | OFF |
|---|---|
| 2 | OFF |
| 3 | OFF |

SEMICONDUCTOR MEMORY SYSTEM HAVING A SNAPSHOT FUNCTION

CLAIM OF PRIORITY

The present application claims priority from Japanese applications P2006-320240 filed on Nov. 28, 2006, and P2007-36236 filed on Feb. 16, 2007 the content of which are hereby incorporated by reference into this application.

BACKGROUND OF THE INVENTION

This invention relates to a semiconductor memory system which uses an electrically rewritable nonvolatile memory, and more particularly, to a method of implementing a snapshot function of memory contents in a storage system which uses a flash memory as a nonvolatile memory.

A semiconductor memory system which is equipped with a flash memory and has a memory control function of preventing execution of a deletion cycle for each change of data stored in the flash memory has been known (e.g., U.S. Pat. No. 5,479,638). The deletion cycle means that a memory cell of a block to be deleted is deleted after programming (data writing) is complete. According to this memory system, the execution of the deletion cycle is prevented by programming update data in an unused part of a memory block without overwriting changing target data itself with the update data unlike a hard disk. However, the programmed memory block is periodically cleaned up. To execute the process, the memory system includes a flag indicating that a sector of each memory block is unused, used, or invalid, and a map for direct correspondence between an eternally provided logical address and a physical address of the memory block.

SUMMARY OF THE INVENTION

One of backup functions incorporated in the storage system is a snapshot function. This snapshot function enables a user to save contents of a past data file to thereby restore the contents later. The conventional semiconductor memory system such as that of U.S. Pat. No. 5,479,638 has a feature that data before and after updating temporarily coexist in the memory because update data is written without overwriting changing target data. This means that contents of a past data file are saved. However, the conventional semiconductor memory system treats a memory part which has stored the data before updating as invalid, and executes control to inhibit access from the outside of the memory system. Accordingly, even when the user wishes to restore the past data file, in the case of the conventional example, irrespective of the data file remaining somewhere in the semiconductor memory system, the user cannot access the data before updating, which creates a problem of disabled effective utilization.

In the case of realizing a snapshot function in the storage system which uses a hard disk drive as a recording medium, a recording medium controller must write past and current contents (or a difference from the past content) of the data file to manage addresses thereof. Accordingly, to access latest data and past data of the snapshot function, a plurality of logical addresses must be converted. This address conversion increases loads on the recording medium controller, which creates another problem.

This invention has been made in view of the aforementioned problems, and it is an object of this invention to enable data backing-up and to reduce loads on a controller in a semiconductor memory system equipped with a flash memory.

This invention provides a storage system for reading/writing data of a host computer (or host apparatus), in which a first data is stored according to a write request from the host apparatus which has designated a first logical address, then a second data is stored according to the write request from the host apparatus which has designated the first logical address and, after the first data and the second data are stored, one of the first data and the second data can be selectively output according to a read request from the host apparatus which has designated the first logical address.

Further, this invention provides a storage system including a flash memory and a memory controller, in which the memory controller is connected to the flash memory to control the flash memory, the flash memory includes a plurality of blocks that can be collectively deleted by the memory controller, each block is divided into a plurality of pages as write units for the memory controller, and the memory controller stores the first data and the second data item in different pages.

In the storage system, in which an address conversion table for storing physical addresses of at least two pages storing data written by designating a logical address from one of logical addresses to be designated by the read request is held in nonvolatile storage unit.

In the storage system of this invention, a page status register for storing one page status allocated to each page is held in the nonvolatile storage unit, and page statuses that can be detected by the memory controller include the at least following four statuses: (1) a status of storing data lastly written by designating a corresponding logical address, (2) a status of storing not latest data written by designating a corresponding logical address, (3) a status of storing invalid data not needed to be stored any more, and (4) a data unwritten status after deletion.

Further, this invention provides a semiconductor memory system, including: a flash memory including a plurality of blocks that can be collectively deleted and a plurality of pages obtained by dividing each block into a plurality of areas to store data; and a memory controller for controlling one of writing and reading in the flash memory by the page units and batch deletion by the block units, in which: the memory controller performs one of reading and writing data of a memory chip based on a logical address included in a request received from a host apparatus; the memory controller includes: a request judgment unit for judging which one of a latest data write request, a snapshot acquisition request, and a release request the received request is if the received request is a write request, and which of a read request of the latest data and a snapshot read request the received request is if the received request is a read request; an address conversion unit for managing a physical address of the page corresponding to the logical address included in the request; a page status setting unit for managing which of valid, invalid, and unwritten statuses stored data is for each page of each block; a snapshot management unit for managing a snapshot generation upon reception of the snapshot acquisition request, the read request, or the release request; an access destination deciding unit for referring to the address conversion unit, the status setting unit, and the snapshot management unit from the logical address included in the request judged by the request judgment unit to decide a physical address of a page to be accessed according to the request; and an access control unit for accessing the decided page according to the request; the address conversion unit includes: a first physical address group for storing a physical address of a page for storing the latest data for each logical address; and a second physical address group for storing a physical address of a page for storing the snapshot for each logical address, and a physical address for each snapshot generation; and the snapshot management unit sets validity or invalidity of an address group for each snapshot generation constituting the second physical address group.

According to this invention, data contents can be saved in the semiconductor memory system at an optional point of time according to the request from the recording medium controller (memory controller), so it is possible to use data after updating and data before updating by one logical address. Moreover, when the snapshot function is realized in the storage system which uses the semiconductor memory system as the recording medium, it is possible to reduce loads on the recording medium controller.

Furthermore, a snapshot generation can be updated for each update of data written in the semiconductor memory system, and usability of the semiconductor memory system can be enhanced.

BRIEF DESCRIPTION OF THE DRAWINGS

FIGS. 2A to 2D are diagrams showing a first half of an example of a change of an internal status (statuses of blocks X to Z, an address conversion table, a page status register, and a snapshot flag) of the semiconductor memory system of the first embodiment, in which FIG. 2A shows an initial status of storing four data, FIG. 2B shows a status after execution of a write command of data A' and B', FIG. 2C shows a status after execution of a snapshot command and a write command of data C' and D', and FIG. 2D shows a status after execution of a write command of a data D".

FIGS. 3A to 3D are diagrams showing a second half of the example of the change of the internal status (statuses of the blocks X to Z, the address conversion table, the page status register, and the snapshot flag) of the semiconductor memory system of the first embodiment, in which FIG. 3A shows a block clean-up process, FIG. 3B shows a status after the block clean-up process, FIG. 3C shows a status after execution of a write command of a data B", and FIG. 3D shows a status after execution of a write command of a data C".

FIGS. 6A to 6E are diagrams showing a first half of an example of an internal status change of a semiconductor memory system according to a second embodiment of this invention, in which FIG. 6A shows an initial status of storing four data, FIG. 6B shows a status after execution of a write command of data A' and B', FIG. 6C shows a status after execution of a first generation snapshot acquisition command and a write command of data C' and D', FIG. 6D shows a status after execution of a second generation snapshot acquisition command and a write command of a data D", and FIG. 6E shows a point of time when data saving by the block clean-up process is completed.

FIGS. 7A to 7E are diagrams showing a second half of the example of the internal status change of the semiconductor memory system of the second embodiment, in which FIG. 7A shows a completed status of the block clean-up process, FIG. 7B shows a status immediately after execution of a snapshot releasing command for releasing a second generation snapshot, FIG. 7C shows a status after execution of a write command of a data C", FIG. 7D shows a status after execution of a snapshot releasing command for releasing a first generation snapshot, and FIG. 7E shows an internal status immediately after execution of a write command of writing a data D".

DETAILED DESCRIPTION OF THE PREFERRED EMBODIMENTS

Figure 1:
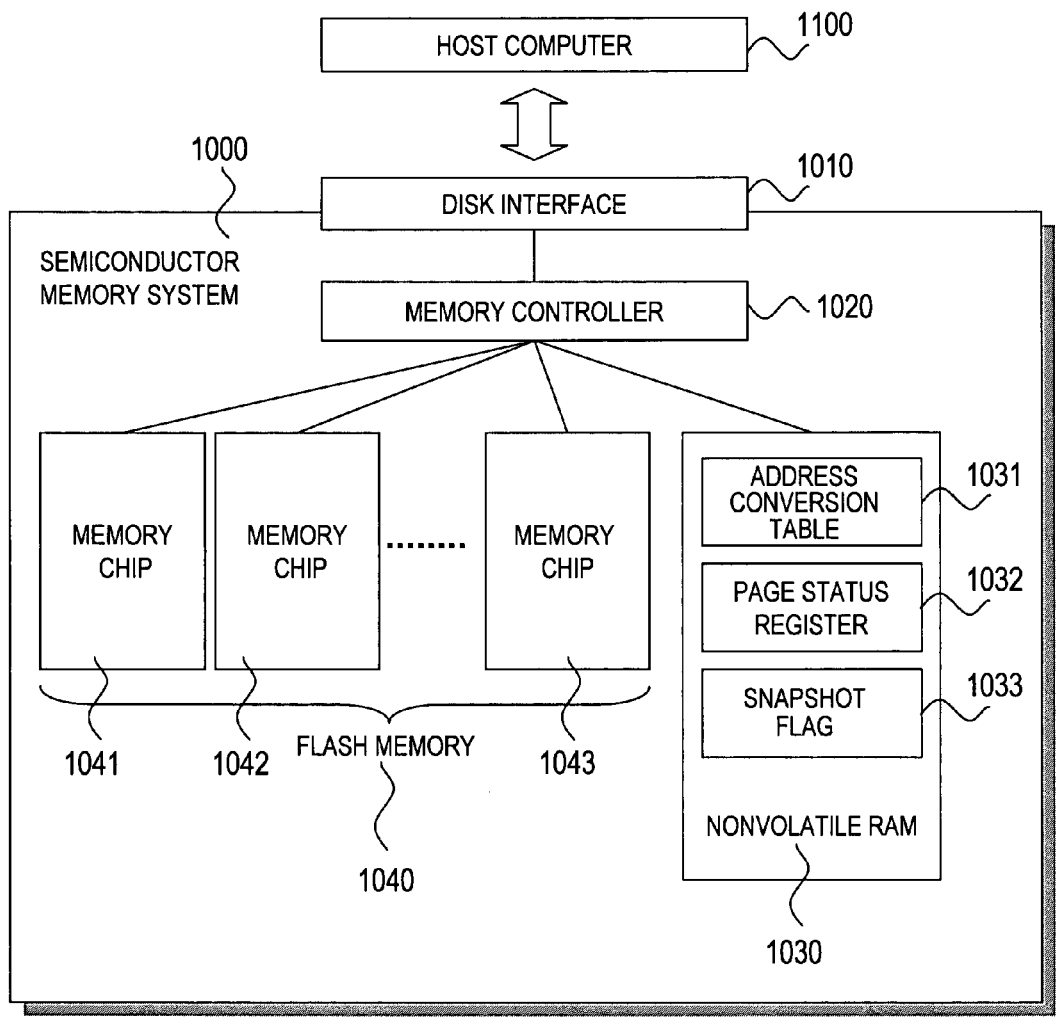
FIG. 1 is a diagram showing a semiconductor memory system according to a first embodiment of this invention.

Referring to the drawings, embodiments of this invention will be described below.

FIG. 1 shows a simple internal configuration of a semiconductor memory system 1000 according to a first embodiment of this invention. The semiconductor memory system 1000 includes a disk interface 1010, a memory controller 1020, a flash memory 1040, and a nonvolatile RAM 1030.

The flash memory 1040 includes one or more memory chips 1041 to 1043 which have enough capacities according to a storage capacity of the semiconductor memory system 1000. The nonvolatile RAM 1030 is a semiconductor memory capable of reading or writing data by byte units, e.g., a magneto-resistance memory or a phase-change memory. This is preferably a nonvolatile storage medium which has a rewriting life longer than that of the flash memory 1040.

The disk interface 1010 is an interface mechanism connected to an external host computer (host apparatus) 1100, and transmits read data stored in the semiconductor memory system 1000 to the host computer 1100 or receives write data to be stored in the semiconductor memory system 1000 from the host computer 1100 in response to a read/write command received from the host computer 1100. The host computer 1100 designates a data storage destination for requesting reading/writing based on a logical address. This logical address is a virtual address different from a physical address used for directly accessing the flash memory 1040.

A configuration of the disk interface 1010 and a protocol of transmission or reception of a command or data should preferably be compliant with interface specifications (e.g., parallel ATA, serial ATA, or SCSI) having compatibility with a standard hard disk drive.

Each of the memory chips 1041 to 1043 of the flash memory 1040 is a nonvolatile semiconductor memory having a structure where data is written by a page unit, and deleted by using a block constituted of a plurality of pages as a unit. Each chip includes a plurality of blocks.

The memory controller 1020 includes a microprocessor connected to the disk interface 1010, the flash memory 1040, and the nonvolatile RAM 1030 to control these components. The memory controller 1020 interprets a command (the read/write command) received from the host computer 1100 via the disk interface 1010, transmits/receives data to/from the host computer 1100 via the disk interface 1010, or executes access (read/write) to the nonvolatile RAM 1030 or access (read/write/delete) to the memory chips 1041 to 1043.

Five types of commands which can be interpreted by the memory controller 1020 and functions thereof will be described below.

Read command: to read data lastly stored in a position designated by a logical address.

Write command: to write data in a position designated by a logical address.

Snapshot command: to enable later reading of data stored in each logical address position at that time.

Recovery read command: to read data stored at the time of receiving a snapshot command to a position designated by a logical address.

Normal operation start command: to enable reading of only lastly stored data in each logical address position.

The memory controller 1020 uses an address conversion table 1031 listing correspondences between logical addresses and physical addresses to manage where, i.e., which physical address page of which memory chip, data corresponding to a logical address designated by the host computer 1100 is stored.

In this address conversion table 1031, a correspondence is set between one logical address and two physical addresses (first and second physical addresses hereinafter). The first physical address indicates a storage position of data lastly written in the logical address. The second physical address indicates a storage position of data written in the logical address at a point of time when the host computer 1100 instructs a snapshot.

The address conversion table 1031 is stored in the nonvolatile RAM 1030, and the memory controller 1020 rewrites contents thereof according to a change in correspondence between a logical address and a physical address. However, a storage destination of the address conversion table 1031 may be a part of the flash memory 1040.

The memory controller 1020 uses a page status register 1032 for managing which status each page included in the memory chip is in. This page status register 1032 stores a status value obtained by encoding a predefined page status based on a value of a predetermined number of bits (e.g., 4 bits). For example, the following four values are defined for status values indicating page statuses. Each status value is represented by a hexadecimal number.

Status value=0: a status where latest data among data written for a logical address corresponding to the page is stored.

Status value=1: a status where data not latest (data before updating) among data written for a logical address corresponding to the page is stored.

Status value=8: a status where invalid data not necessary any more is stored.

Status value=F: a status where no data has been written since deletion of a block including the page.

The page status register 1032 holds the status values by block units. For example, when a page status value of a certain block is "880F", first and second pages include invalid data, a third page includes latest data corresponding to a certain logical address, and a fourth page is unwritten. The example where the number of bits for the page status value is represented by 4 bits is described. However, the number of bits only needs to be compliant with a type of a status value, and a status value may be represented by the smaller number of bits such as 3 bits or 2 bits.

The page status register 1032 is stored in the nonvolatile RAM 1030, and the memory controller 1020 rewrites contents according to a change in page status. However, a storage destination of the page status register 1032 may be a part of the flash memory 1040.

The memory controller 1020 uses a snapshot flag 1033 for managing a status as to whether the host computer 1100 is using the snapshot function of the semiconductor memory system 1000. This snapshot flag 1033 is stored in the nonvolatile RAM 1030, and the memory controller 1020 rewrites contents according to a change in use status. However, a storage destination of the snapshot flag 1033 may be part of the flash memory 1040.

FIGS. 2A to 2D and FIGS. 3A to 3D sequentially show an example of a change of contents for data stored in the flash memory 1040, the address conversion table 1031 of the nonvolatile RAM 1030, the page status register 1032, and the snapshot flag 1033 to describe a memory management process executed by the memory controller 1020 when the snapshot function is used in the semiconductor memory system 1000 of this invention. Changes of data in the flash memory 1040 and in the nonvolatile RAM 1030 are shown in FIGS. 2A to 3D, and the process starts from FIG. 2A, passes through FIGS. 2B to 2D and FIGS. 3A to 3C in this order, and ends in FIG. 3D.

Figure 2A:
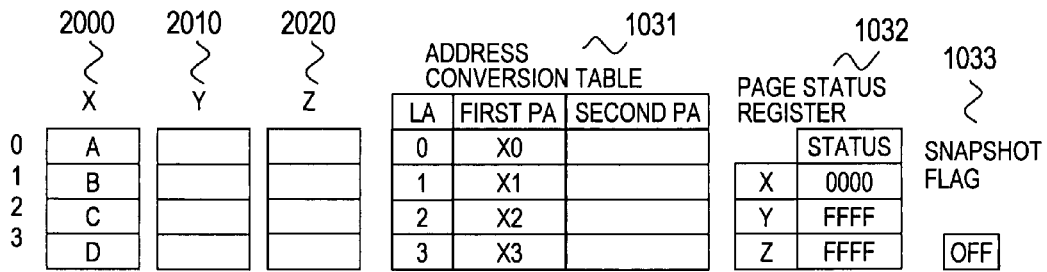

In the example shown in the figures, to simplify description, logical addresses that can be designated from the host computer 1100 are sector units (1 sector=512 bytes), and a range thereof is limited to four sectors of 0 to 3. Only three blocks (block X 2000, block Y 2010, and block Z 2020) of the memory chips are used for reading or writing data. Each block of the memory chips is constituted of four pages, and a size of each page is 512 bytes (1 sector). Each page is represented by one of numerals 0 to 3, and an absolute physical address of each page is abbreviated as X3, Y0, or Z1. As shown in FIG. 2A, in the address conversion table 1031, LA indicates a logical address, a first PA indicates a first physical address, and a second PA indicates a second physical address. The first physical address stores each physical address of a page corresponding to each of a plurality of logical addresses, and each physical address indicates a page which has stored latest data. The second physical address stores each physical address of a page corresponding to each of a plurality of logical addresses, and each physical address indicates a page which has stored data before updating (snapshot).

First, it is presumed that the snapshot function is invalid and, as shown in FIG. 2A, physical page addresses X0 to X3 are set in a block X 2000, and data A to D corresponding to logical addresses 0 to 3 have been stored, respectively. The logical addresses 0 to 3 have been allocated by the memory controller. Blocks Y 2010 and Z 2020 have been deleted, and no data have been written in all the pages.

At this time, Xn (n=0 to 3) is set in each first physical address of a logical address LA=n in the address conversion table 1031, and no second physical addresses have been set in any logical addresses. Page status values of the blocks X to Z in the page status register 1032 are set to "0000", "FFFF", and "FFFF", respectively, and OFF is set in a snapshot flag 1033. In other words, in a status shown in FIG. 2A, in the address conversion table 1031, a logical address LA=0 corresponds to a first physical address X0 indicating the block X 2000, a logical address LA=1 corresponds to a first physical address X1 indicating the block X 2000, a logical address LA=2 corresponds to a first physical address=X2 indicating the block X 2000, and a logical address LA=3 corresponds to a first physical address=X3 indicating the block X 2000. For first to fourth pages of the block X 2000, a status value of each page is "0" as in the case of "X" of the page status register 1032, and latest data has been stored.

From this status, the host computer 1100 issues commands to the semiconductor memory system 1000 in the following order.

(1) A write command for writing data A' and B' in logical addresses LA=0 and 1, respectively.

(2) A snapshot command.

(3) A write command for writing data C' and D' in logical addresses LA=2 and 3, respectively.
(4) A write command for writing a data D" in the logical address LA=3.
(5) A read command for reading data from the logical addresses LA=0 to 3.
(6) A recovery read command for reading data from the logical addresses 0 to 3.
(7) A normal operation start (snapshot function releasing) command.
(8) A write command for writing a data B'" in the logical address LA=1.
(9) A write command for writing a data C" In the logical address LA=2.

Figure 2B:
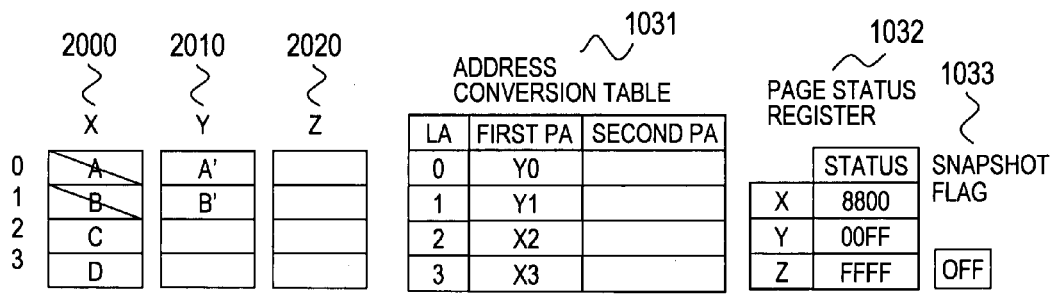

FIG. 2B shows an internal status of the flash memory 1040 and the nonvolatile RAM 1030 immediately after the command (1) is received to be executed. Upon reception of the write command (1), the memory controller 1020 refers to the page status register 1032 to find that a page of the block X 2000 corresponding to the logical addresses LA=0 and 1 is a status value=0, and latest data has been written. Accordingly, the memory controller 1020 refers to the page status register 1032 of the block Y 2010 which is a next block corresponding to the same logical address LA to select two pages at Y0 and Y1 of status values=F (unwritten), and writes the data A' and B' in these pages, respectively.

The writing of data in the blocks is executed into free sectors of the blocks in predetermined order. For example, in FIG. 2B, data are written in order of free pages of each block.

Then, the memory controller 1020 detects first physical addresses X0 and X1 corresponding to the logical addresses 0 and 1 from the address conversion table 1031, and pages status values of X0 and X1 of the page status register 1032 are set to 8 (invalid data) since latest data has been written in the pages 1 and 2 of the block X 2000. The memory controller 1020 sets physical addresses Y0 and Y1 of the block Y 2010 where latest data has been written in first physical addresses corresponding to the logical addresses LA=0 and 1 of the address conversion table 1031, and sets page status values corresponding to Y0 and Y1 of the page status register 1032 to 0 (latest data).

When the snapshot function is invalid, the memory controller 1020 sequentially writes new data in free pages of each block, sets a value of the page status register 1032 to "8" with past data set as invalid, and uses only the first physical address of the address conversion table 1031 to set a physical address of a block where latest data has been written in the first physical address.

Then, upon reception of the snapshot command (2), the memory controller 1020 sets ON in the snapshot flag 1033. The write commands thereafter are processed by validating the snapshot function to prevent a loss of the data stored thus far as follows.

Figure 2C:
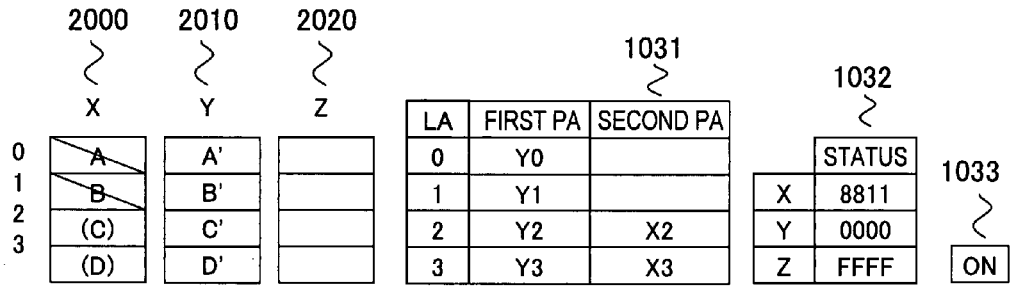

FIG. 2C shows an internal status immediately after the write command (3) is executed. Upon reception of the command (3), the memory controller 1020 refers to the page status register 1032 to select two pages at Y2 and Y3 of status values=F (unwritten), and the data C' and D' are written in these pages at Y2 and Y3, respectively.

Then, the memory controller 1020 detects first physical addresses X2 and X3 corresponding to the logical addresses LA=2 and 3 from the address conversion table 1031, and sets X2 and X3 in the sections of the second physical addresses, respectively. The memory controller 1020 sets page status values of X2 and X3 of the page status registers 1032 to "1" (snapshot data). Accordingly, a status value of the page status register 1032 of the block X 2000 is "8811". The memory controller 1020 sets Y2 and Y3 in first physical addresses for physical addresses of latest data corresponding to the logical addresses LA=2 and 3 of the address conversion table 1031, and sets pages status values of Y2 and Y3 of the page status register 1032 to 0 (latest data), respectively. Accordingly, a value of the page status register 1032 of the block Y 2010 is set to "0000".

As shown in FIG. 2C, in the address conversion table 1031, physical addresses "Y2 and Y3" of the block Y 2010 which has stored the latest data "A' and B'" are set to first physical addresses in the logical addresses LA=2 and 3, and physical addresses "X2 and X3" of the block X 2000 which has stored the data "A and B" immediately before the data becomes unnecessary to second physical addresses, respectively. By correlating two physical addresses with one logical address, the host computer 1100 can access latest snapshot data and snapshot data.

Figure 2D:
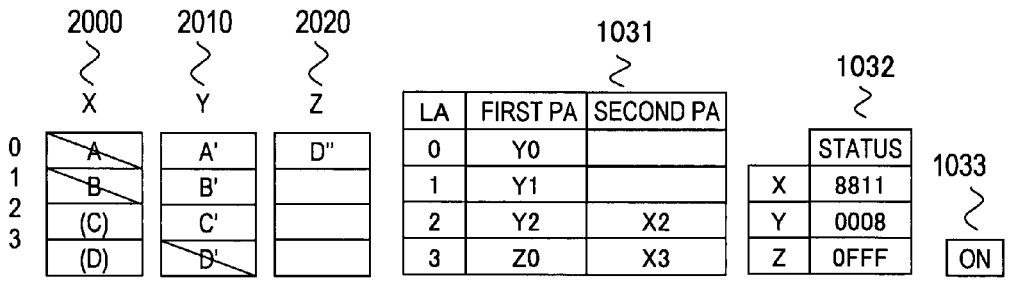
Figure 3A:
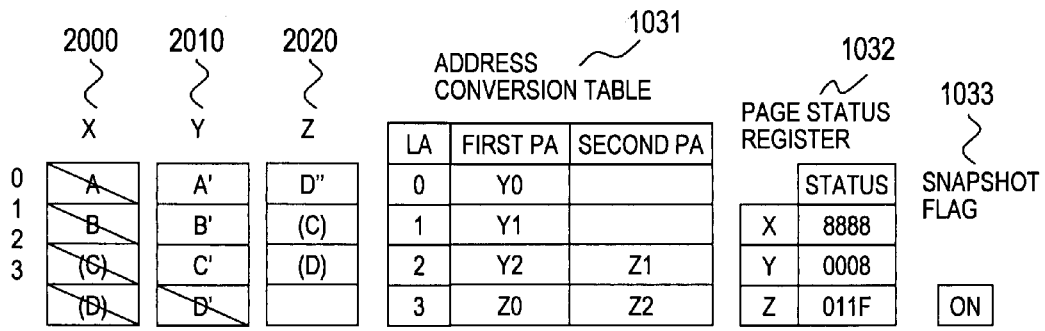
Figure 3B:
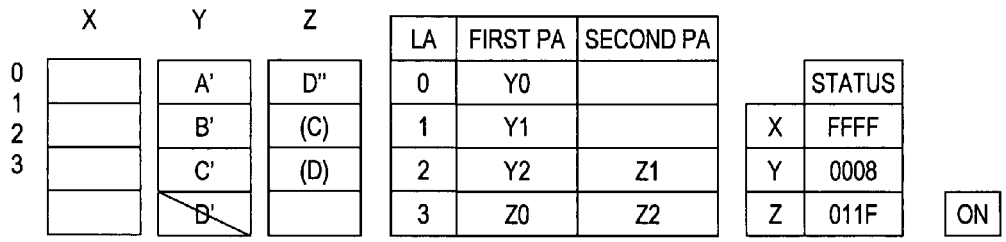

FIGS. 2D and 3A show an internal status of the flash memory 1040 and the nonvolatile RAM 1030 while the command (4) is processed, and FIG. 3B shows an internal status of the flash memory 1040 and the nonvolatile RAM 1030 immediately after the execution of the command (4) is completed. Upon reception of the write command (4) of the data "D'" of the logical address LA=3, the memory controller 1020 refers to the page status register 1032 to select one page at Z0 of a status value=F (unwritten), and writes the data "D'" in the page at Z0.

Then, the memory controller 1020 detects a first physical address Y3 of the logical address LA=3 form the address conversion table 1031, and sets a page status value of Y3 of the page status register 1032 corresponding to the updated data "D'" to 8 (invalid data). The memory controller 1020 sets a physical address Z0 corresponding to the newly written data "D'" in the first physical address of the logical address LA=3 of the address conversion table 1031, and a page status value of Z0 of the page status register 1032 is set to 0 (latest data). FIG. 2D shows an internal status of the flash memory 1040 and the nonvolatile RAM 1030 at a point of time when the data D" is written. Accordingly, a status value of the page status register 1032 of the block Y 2010 is set to "0008", and a status value of the page status register 1032 of the block Z 2020 is set to "0FFF".

When a total number of data unwritten pages is equal to or less than a predetermined value (e.g., total number of unwritten pages of blocks X to Z is 3), by taking this as a trigger, the memory controller 1020 carries out the following clean-up process to increase the total number of unwritten pages of the logical addresses LA=0 to 3. In this process, data is deleted by a block unit because of the characteristics of the flash memory 1040. Thus, if latest data or data to be saved as a snapshot exists in a block, the data is deleted after it is saved in the other block.

First, the memory controller 1020 refers to the page status register 1032 to select a block X 2000 which includes most pages of page status values=8 (invalid data). The memory controller 1020 detects pages storing data to be saved in the block X 2000 of a deletion target, i.e., two pages at X2 and X3 of a page status value=0 (latest data) or 1 (snapshot data) as pages to be saved.

Then, the memory controller 1020 copies stored data C and D of pages of saving targets to pages at Z1 and Z2 of a page status value=F (unwritten) of the block Z 2020 not to be deleted this time. Upon completion of the copying, page status values of X2 and X3 of the page status register 1032 are copied to page status values of Z1 and Z2, and page status values of X2 and X3 are set to 8 (invalid data).

The memory controller 1020 retrieves two sections where the physical addresses X2 and X3 of the block X 2000 of the data saved from the block X 2000 to the block Z 2020 have been set in the address conversion table 1032, and sets physical addresses Z1 and Z2 of the block Z 2020 which are new storage destinations in the sections.

Accordingly, a page status value of the block X 2000 of the deletion target is set to "8888", making all the pages invalid data, and a page status value of the block Z 2020 of the saving destination is set to "011F", realizing a block which includes snapshot data in pages 2 and 3.

FIG. 3A shows an internal status of the flash memory 1040 and the nonvolatile RAM 1030 after the snapshot of the block X 2000 is moved to the block Z 2020.

Then, the memory controller 1020 deletes the block X 2000 to set a page status value=FFFF of the block X 2000. FIG. 3B shows an internal status of the flash memory 1040 and the nonvolatile RAM 1030 at a point of time when the deletion of the block X 2000 is completed. According to the block clean-up process described above, the total number of data unwritten pages increases from 3 to 5.

Upon reception of the read command (5), to refer to the requested logical addresses LA=0 to 3, the memory controller 1020 detects pages at Y0 to Y2 and Z0 of first physical addresses corresponding to the logical addresses LA=0 to 3 from the address conversion table 1031 of FIG. 3B, reads data A', B', C', and D" stored in pages indicated by the physical addresses Y0 to Y2 and Z0, and transmits the data to the host computer 1100, respectively. These are data lastly stored in the logical addresses.

Upon reception of the recovery command (3) of the logical addresses LA=0 to 3, the memory controller 1020 detects pages at Y0 and Y1 of first physical addresses corresponding to the logical addresses LA=0 and 1 from the address conversion table 1031 shown in FIG. 3B, detects pages at Z1 and Z2 of second physical addresses corresponding to the logical addresses LA=2 and 3, reads data A', B', C, and D stored in pages indicated by the detected physical addresses, and transmits the data to the host computer 1100, respectively. These are data stored in the logical addresses LA at a point of time when the snapshot command is received. As the data A' and B' of the logical addresses LA=0 and 1 have not been updated since the reception of the snapshot command, second physical addresses of the logical addresses LA=0 and 1 have been unset, respectively. Thus, the pages of the first physical addresses are referred to.

Upon reception of the snapshot function release command (7), the memory controller 1020 sets OFF in the snapshot flag 1033. In the read commands thereafter, only data lastly stored in the logical address can be read. Only the first physical address of the address conversion table 1031 is referred to invalidate the second physical address, and reference to the snapshot data is inhibited.

Figure 3C:
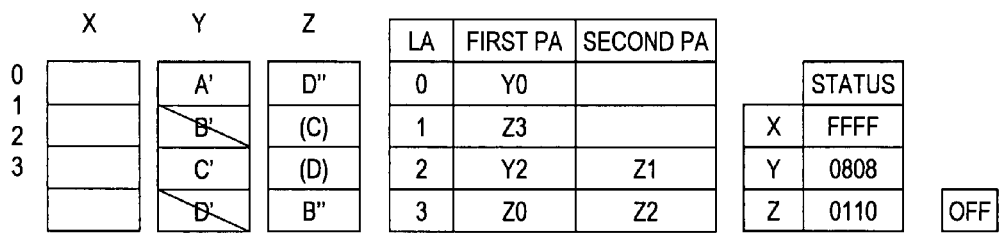

FIG. 3C shows an internal status of the flash memory 1040 and the nonvolatile RAM 1030 immediately after execution of the write command (8) of the data B". Upon reception of the write command of a data "B'"" for the logical address LA=1, the memory controller 1020 refers to the page status register 1032 to select one page at Z3 of a page status value=F (unwritten), and writes a data B" in a page 3 of this block Z 2020. Then, the memory controller 1020 detects a first physical address Y1 of the logical address LA=1 from the address conversion table 1031, and sets a page status value of Y1 of the page status register 1032 to 8 (invalid data). A physical address=Z3 of a page where data is written this time in the first physical address of the logical address LA=1 of the address conversion table 1031 is set, and a page status value of Z3 of the page status register 1032 is set to 0 (latest data).

According to the writing process of the memory controller 1020, writing is sequentially executed from a head physical address of the block to a last address and, when there are no more free pages in the block, writing is carried out in a next block. Thus, the memory controller 1020 can write data in all the pages of the block X 2000, but free pages of the currently written block Z 2020 are wasted.

Figure 3D:
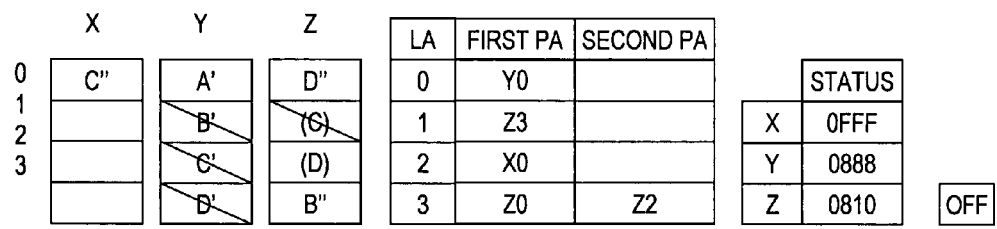

FIG. 3D shows an internal status of the flash memory 1040 and the nonvolatile RAM 1030 immediately after execution of the write command (9) of a data C" in the logical address LA=2. Upon reception of the write command in the logical address LA=2, the memory controller 1020 refers to the page status register 1032 to select one page at X0 of a page status value=F (unwritten), and writes the data C" in this page at X0. As there is no free page in the block Z 2020 where writing has been executed previously, the memory controller 1020 refers to the page status register 1032 of a next block X 2000. To sequentially use free pages of the blocks X 2000 to Z 2020 allocated to the logical addresses LA=0 to 3, respectively, cyclically, the memory controller 1020 refers to the next block X 2000 if here is no free page in the block Z 2020.

Then, the memory controller 1020 detects first and second physical addresses Y2 and Z1 of the logical address LA=2 from the address conversion table 1031, and sets page status values of Y2 and Z1 of the page status register 1032 to 8 (invalid data). A physical address=X0 of the newly written data C" is set in the first physical address of the logical address LA=2 of the address conversion table 1031 to clear the second physical address. Lastly, the memory controller 1020 sets a page status value of X0 of the page status register 1032 where the new data C" has been written to 0 (latest data).

Thus, not only the data C" immediately before updating but also the snapshot data D are invalidated after the snapshot function is released.

Figure 4:
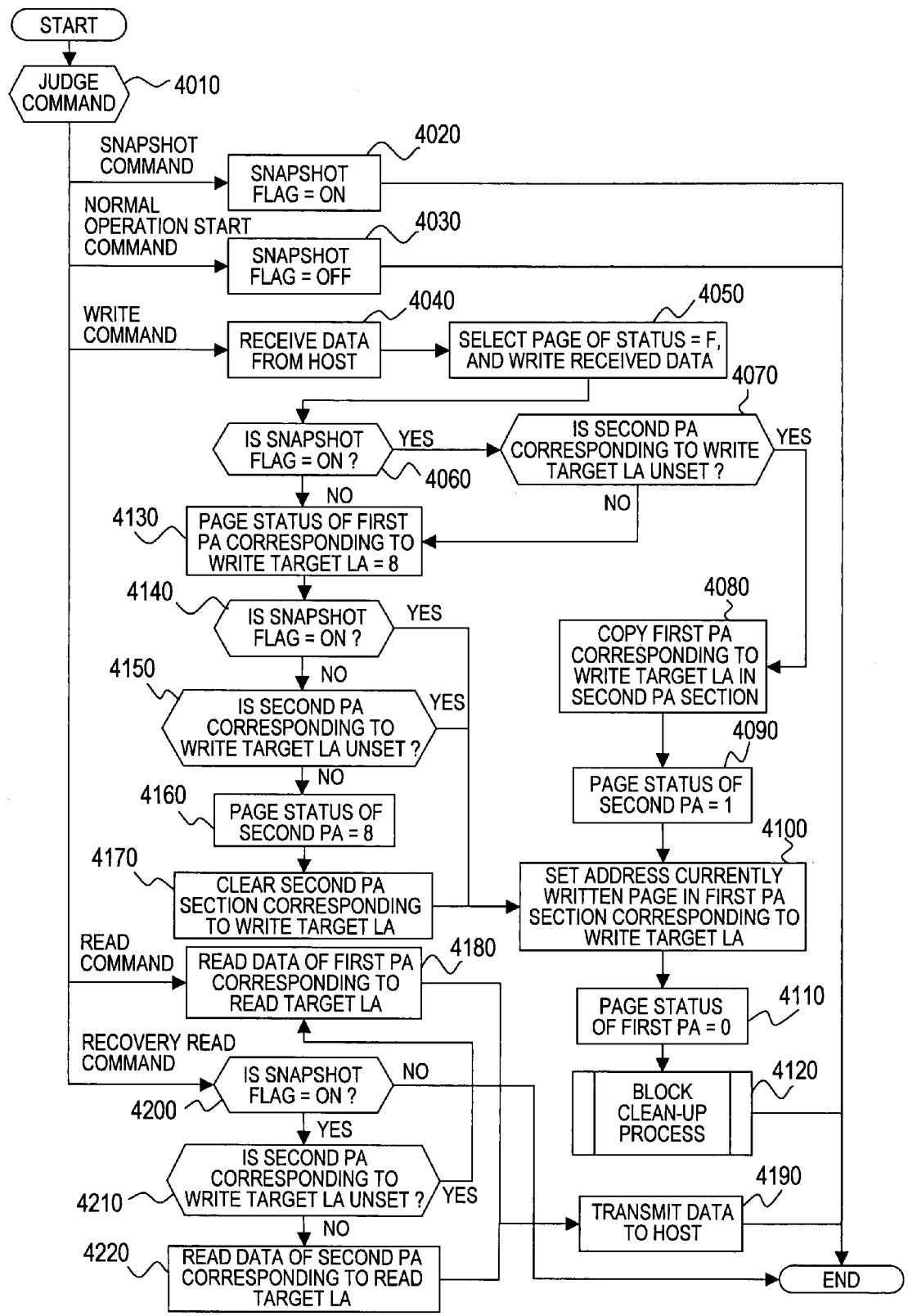
FIG. 4 is a flowchart showing a processing procedure executed by a memory controller for a command received from a host computer according to the first embodiment.

FIG. 4 is a flowchart showing a processing procedure executed by the memory controller 1020 for a command received from the host computer 1100. The procedure will be described below.

First, a type of a received command is judged (4010).

If a result of the judgment of the step 4010 is a snapshot command, the snapshot flag 1033 is set to ON (4020) to finish the command process.

If a result of the command judgment of the step 4010 is a normal operation start command, the snapshot flag 1033 is set to OFF (4030) to finish the command process.

If a written command judgment result is a write command, data for writing is received from the host computer 1100 (4040) to select a page of a page status value=F, and the received data is written in the page (4050). At this time, retrieval of unwritten page, status values "F" is sequentially carried out from a page next to a previously written page to the blocks X 2000 to Z 2020.

Then, whether the snapshot flag 1033 is ON is investigated (4060). If a result of the step 4060 is "yes" (ON), it is investigated whether a second physical address corresponding to a logical address designated as a writing destination in the address conversion table 1031 is unset (4070). If a result of the step 4070 is "yes" (unset), a value of a first physical address corresponding to the logical address is copied to a section of the second physical address corresponding to this logical address LA (4080). A page status value indicated by the second physical address in the page status register 1032 is set to 1, indicting a snapshot (4090). A physical address of a page where the received data is written in the step 4050 is set in a section of the first physical address corresponding to the logical address in the address conversion table 1031 (4100), and a page status value of a page indicated by the first physical address of the logical address LA in the page status register 1032 is set to 0 (4110). Subsequently, a block clean-up process is executed (4120) to finish the command process.

On the other hand, if the judgment result for the snapshot function of the step 4060 is "no" (OFF), and if the judgment result (for setting or unsetting of snapshot) of the step 4070 is "no" (set), a page status value of a page indicated by the first physical address corresponding to a writing destination logical address in the page status register 1032 is set to 8 (4130). Then, whether the snapshot flag 1033 is ON is investigated (4140). If a result of the step 4140 is "yes" (ON), the process proceeds to the step 4110. If the result is "no" (OFF), the process proceeds to the step 4150.

In the step 4150 where the snapshot function is invalid, it is investigated whether a second physical address corresponding to the writing destination logical address in the address conversion table 1031 is unset. If a result of the step 4150 is "yes" (unset), the process proceeds to the step 4100. If the result is "no" (set), a page status value of a page indicated by the second physical address in the page status register 1032 is set to 8 (invalid data) (4160). A section of the second physical address corresponding to the writing destination logical address in the address conversion table 1031 is cleared to an unset status (4170).

After the step 4170, the process proceeds to the step 4100. If a range of logical addresses where data are to be written by the write command includes a plurality of sectors, the process of the step 4060 and the subsequent steps is executed for each sector.

If the command judgment result of the step 4010 is a read command, a first physical address corresponding to a logical address indicated by the command in the address conversion table 1031 is detected, and data is read from a page indicated by the address (4180). Then, the data is transmitted to the host computer (4190) to finish the command process.

If the command judgment result of the step 4010 is a recovery read command, whether the snapshot flag 1033 is ON is investigated (4200). If the result is "yes" (ON), it is investigated whether a second physical address corresponding to the logical address designated by the command in the address conversion table 1031 is unset (4210). If the result is "no" (set), data is read from a page indicated by the second physical address (4220). Then, the data is transmitted to the host computer (4190) to finish the command process. On the other hand, if the result of the step 4200 is "no" (OFF), data requested by the host computer 1100 cannot be transmitted, and thus judged that an error has occurred to finish the command process. If the result of the step 4210 is "yes" (unset), the process proceeds to the step 4180. In other words, the command is processed as in the case of a normal read command. When a range of logical addresses to be read by the recovery read command includes a plurality of sectors, the process of the step 4200 and the subsequent steps is carried out for each sector.

Figure 5:
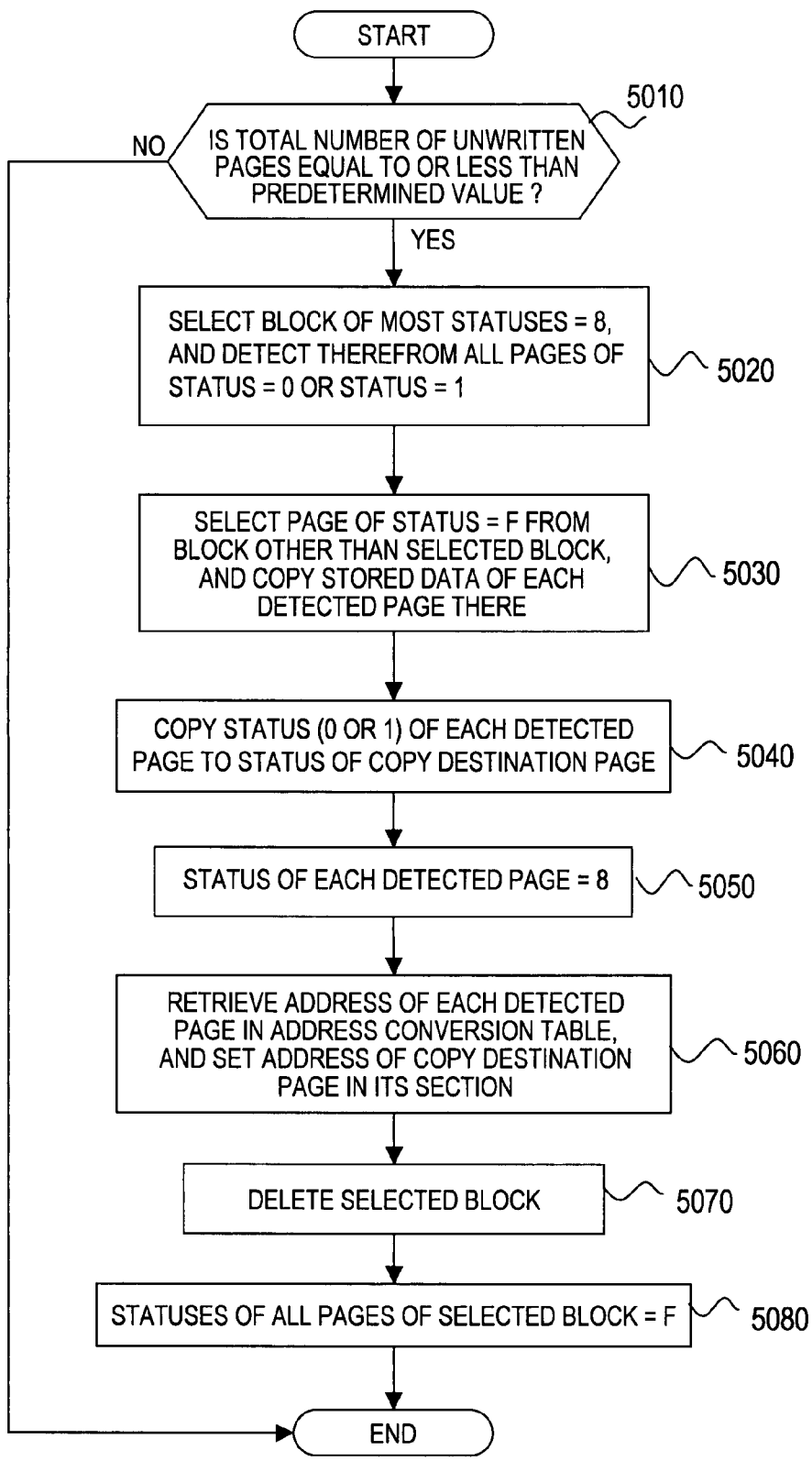
FIG. 5 is a flowchart showing a block clean-up process executed by the memory controller according to the first embodiment.

FIG. 5 is a flowchart showing a detailed processing procedure of the block clean-up step 4120 shown FIG. 4. The procedure will be described below.

First, the memory controller 1020 refers to the page status register 1032 to investigate whether the total number of pages of page status values=F (unwritten) is equal to or less than a predetermined value (e.g., 3) (5010). If a result of the step 5010 is "no" (larger than the predetermined value), nothing is executed to finish the process. On the other hand, if the result is "yes" (equal to or less than the predetermined value), one block which includes most pages of page status values=8 (invalid data) is selected to be set as a deletion target block. All the pages of page status values=0 (latest data) or page status values=1 (snapshot data) of the selected deletion target block are detected (5020). The number of detected pages is indicated by N, and set as saving target pages. N unwritten pages of page status values=F of a block other than the selected deletion target block are selected, and data stored in the saving target pages detected in the step 5020 are copied (saved) to one of the unwritten pages (5030). Then, in the page status register 1032, a page status value (0 or 1) of each saving target page detected in the step 5020 is copied to a page status value of a data copying destination page executed in the step 5030 (5040). All the page status values of the pages detected in the step 5020 are set to 8 (invalid data) (5050). Then, by retrieving addresses of the deletion target pages detected in the step 5020 from all the first and second physical addresses set in the address conversion table 1031, sections where the addresses are set are detected, and the physical addresses of the copying destination pages subjected to copying in the step 5030 are moved to the detected sections (5060). In other words, in the address conversion table 1031, the first and second physical addresses corresponding to the copying source logical address LA are moved to the first and second physical addresses corresponding to the copying destination logical address to delete values of the copying source physical addresses. Accordingly, all the pages of the deletion target block selected in the step 5020 are invalidated, and saving of page data which has been stored in the block to be saved is completed.

Then, the block selected in the step 5020 is deleted (5070). This deletion means writing of a predetermined value in all the pages of the block. Page status values of all the pages of the deletion target block in the page status register 1032 are set to F (unwritten) (5080) to finish the process.

A detailed method of implementing the address conversion table 1031 will be described. The section of the second physical address in the address conversion table 1031 may be "set" or "unset" depending on the logical address LA. When the address conversion table 1031 is implemented by using the nonvolatile RAM 1030, needless to say, it is impossible to prevent writing of any value in a storage position equivalent to the section of the second physical address. In this case, by defining a special value meaning "unset" and writing the value in the nonvolatile RAM 1030, unsetting of each second physical address is represented. For example, if a range of physical addresses necessary for identifying pages in the semiconductor memory system 1000 can be represented by values of 31 bits, a value "FFFFFFFF (hexadecimal number) of 32 bits is defined as a value meaning "unset". Accordingly, if this value has been set in the storage position equivalent to the section of the second physical address, the memory controller 1020 judges that "the second physical address is unset". When the memory controller 1020 sets this value in the storage position equivalent to the section of the second physical address, it means that "the second physical address is cleared".

One embodiment of this invention has been described above. It is possible to achieve a higher snapshot function by extending the address conversion table 1031. For example, by adding third to fifth physical address sections to the address conversion table 1031, it is possible to manage snapshot data of four generations at the maximum. In this case, the function should preferably be extended so that parameters indicating generations can be provided to the recovery read command, whereby the host computer 1100 can read snapshot data of a desired generation.

For the block clean-up process carried out in the semiconductor memory system 1000 to which this invention is applied, the deciding condition of the block to be deleted is not limited to "the number of included invalid pages should be maximum". The number of times of deleting each block of the flash memory may be counted to set "the number of deletion times should be minimum" as a condition, and various conditions can be applied.

It is not limited to the command from the host computer 1100 that instructs starting of the snapshot function. The semiconductor memory system 1000 can start the snapshot function based on its own judgment. For example, when the memory controller 1020 judges that a remaining life of the storage system is short because of a very large number of deletion times of each block of the flash memory, the snapshot flag 1033 may be automatically set to ON.

Furthermore, according to the first embodiment, the two types of commands, i.e., the read command and the recovery read command, are prepared so that the host computer 1100 can read both latest data and snapshot data. However, the process is not limited to this method. For example, a method which uses two types of commands, a normal read command and a read data selection command, can be employed. In this case, after data to be read is selected from two latest and snapshot data by the read data selection command, the data is read by the normal read command.

Second Embodiment

A second embodiment of this invention discloses a semiconductor memory system which can manage snapshot data of three generations at the maximum. According to the first embodiment, the snapshot data of a plurality of generations can be managed. However, the second embodiment is different from the first embodiment in that configurations and a using method of the address conversion table 1031, the page status register 1032, and the snapshot flag 1033 are different from those of the first embodiment, and the memory controller 1020 interprets a command for individually releasing a designated generation number among a plurality of obtained snapshots. Other components are the same as those of the first embodiment.

A simple internal configuration of the semiconductor memory system 1000 to which this invention is applied is shown in FIG. 1 as in the case of the first embodiment. Portions different from the first embodiment will be described below.

Five types of commands interpreted by the memory controller 1020 and functions thereof according to the second embodiment are as follows.
Read data selection command: to select a type (generation) of data to be read by a read command from latest/N-th generation snapshots (N=0 to 3). However, a size of a generation number N does not always corresponds to new or old generations.
Read command: to read a type of data selected by the read data selection command among data stored thus far in a designated logical address.
Write command: to write latest data in the designated logical address.
Snapshot acquisition command: to enable later reading of data stored in each logical address at that time. When a snapshot is successfully obtained, a generation number used for the read data selection command or a snapshot release command is returned.
Snapshot release command: to discard snapshot data of a designated generation number, and to inhibit it's reading thereafter.

In the address conversion table 1031 of the second embodiment, a correspondence is set between one logical address and four physical addresses (first to fourth physical addresses hereinafter). The first physical address stores a storage position (physical address) of data (latest data) lastly written in the logical address. In the second to fourth physical addresses, a host computer 1100 stores a storage position of latest data stored in each logical address at the time of receiving the snapshot acquisition command. According to the second embodiment, up to three generations of snapshots can be managed by the memory controller 1020.

Page statuses stored in the page status register 1032 of the second embodiment are the following four. Each status value is represented by a hexadecimal number.
Status value=0: a status where valid data that can be read by the host computer is stored.
Status value=8: a status where invalid data not necessary any more is stored.
Status value=F: a status where no data has been written since deletion of a block including the page.

The snapshot flag 1033 of the second embodiment manages whether a generation has been obtained (ON) or released (OFF) for each of generation numbers (1 to 3) of snapshots by three generations.

According to the second embodiment, the memory controller 1020 includes a nonvolatile RAM, and the host computer 1100 temporarily holds types (generations: N=0 to 3) selected by the read data selection command in a partial area of the nonvolatile RAM. The nonvolatile RAM and its area will be referred to as a read data selection register. The following four are defined for type values (designated values of generations) stored in the read data selection register. The read data selection register is initialized to a type value=0 immediately after power is turned on for the semiconductor memory system 1000.
Type value=0: latest data (initial value).
Type value=1: first generation snapshot.
Type value=2: second generation snapshot.
Type value=3: third generation snapshot.

FIGS. 6A to 6E and FIGS. 7A to 7E sequentially show an example of a change of contents for data stored in the flash memory 1040, the address conversion table 1031, the page status register 1032, and the snapshot flag 1033 to describe a memory management process executed by the memory controller 1020 when the snapshot function is used in the semiconductor memory system 1000 of this invention. The process starts from FIG. 6A, passes through FIGS. 6B to 6E and FIGS. 7A to 7D in this order, and ends in FIG. 7E.

In the example shown in the figures, to simplify description, logical addresses that can be designated from the host computer 1100 are sector units (1 sector=512 bytes), and a range thereof is limited to four sectors of 0 to 3. Only three blocks (block X 2000, block Y 2010, and block Z 2020) of the memory chips 1041 to 1043 are used for reading or writing data. The blocks 2000 to 2030 of the memory chips are each constituted of four pages, and a size of each page is 512 bytes (1 sector). Each page is represented by one of numerals 0 to 3, and an absolute physical address of each page is abbreviated as X3, Y0, or Z1. In the address conversion table 1031, LA indicates a logical address, a first PA indicates a first physical address, a second PA indicates a second physical address, and a third PA indicates a third physical address. A fourth PA (fourth physical address) exists but is not used in this description, so it is not shown in the figure.

The first physical address stores each physical address of a page corresponding to each of a plurality of logical addresses, and each physical address indicates a page which has stored latest data. The second physical address stores each physical address of a page corresponding to each of a plurality of logical addresses, and each physical address indicates a page which has stored a first generation snapshot. The third physical address stores a physical address of a page corresponding to each of a plurality of logical addresses, and each physical address indicates a page which stores a second generation snapshot. The fourth physical address stores each physical address of a page corresponding to each of the plurality of logical addresses, and each physical address indicates a page which stores a fourth generation snapshot. First physical addresses constitute a first physical address group for storing physical addresses of pages of latest data, and second to forth physical addresses constitute a second physical address group for storing physical addresses of snapshots for each generation.

First, it is presumed that no snapshot has been obtained and, as shown in FIG. 6A, data A to D corresponding to logical addresses 0 to 3 have been stored in positions of physical page addresses X0 to X3, respectively. The logical addresses 0 to 3 are allocated by the memory controller 1020. It is also presumed that blocks Y 2010 and Z 2020 have been deleted, and no data has been written in any pages.

At this time, in the address conversion table 1031, Xn (n=0 to 3) is set in each first physical address of a logical address LA=n, second to fourth physical addresses have not been set in any logical address, page status values of blocks X, Y, and Z of the page status register 1032 are set to "0000", "FFFF", and "FFFF", respectively, and OFF is set for all the three generations in the snapshot flag 1033.

A type value=0 meaning "latest" is set in the read data selection register. This means a status where latest data can be read by a read command.

From this status, the host computer 1100 issues commands to the semiconductor memory system 1000 in the following order.

(1) A write command for writing the data A' and B' in logical addresses LA=0 and 1, respectively.
(2) A snapshot acquisition command (first generation).
(3) A write command for writing the data C' and D' in logical addresses LA=2 and 3, respectively.
(4) A snapshot acquisition command (second generation).
(5) A write command for writing the data D" in the logical address LA=3.
(6) A read data selection command for selecting the first generation snapshot.
(7) A read command for reading data from the logical addresses LA=0 to 3.
(8) A read data selection command for selecting the second generation snapshot.
(9) A read command for reading data from the logical addresses 0 to 3.
(10) A read data selection command for selecting latest data.
(11) A read command for reading data of the logical addressees LA=0 to 3.
(12) A snapshot release command for releasing the second generation.
(13) A write command for writing the data C" in the logical address LA=2.
(14) A snapshot release command for releasing the first generation.
(15) A write command for writing a data D"' in the logical address LA=3.

FIG. 6B shows an internal status of the flash memory 1040 and the nonvolatile RAM 1030 immediately after the write command (1) is received to be executed. Upon reception of the write command (1), the memory controller 1020 refers to the page status register 1032 to find that a page of the block X 2000 corresponding to the logical addresses LA=0 and 1 is a status value=0, and latest data has been written. Accordingly, the memory controller 1020 refers to the page status register 1032 of the block Y 2010 which is a next block corresponding to the same logical address LA to select two pages at Y0 and Y1 of status values=F (unwritten), and writes data A' and B' therein, respectively. The writing of data in the blocks is executed into free sectors of the blocks in predetermined order as in the first embodiment. For example, in FIG. 6B, data are written in order of free pages of each block.

Then, the memory controller 1020 detects first physical addresses X0 and X1 of the logical addresses 0 and 1 from the address conversion table 1031, and pages status values of X0 and X1 of the page status register 1032 are set to 8 (invalid data) since latest data has been written in the pages 1 and 2 of the block X 2000. The memory controller 1020 sets physical addresses Y0 and Y1 of the block Y 2010 where latest data has been written in first physical addresses corresponding to the logical addresses LA=0 and 1 of the address conversion table 1031, and sets page status values corresponding to Y0 and Y1 of the page status register 1032 to 0 (latest data).

Then, upon reception of the snapshot acquisition command (2), the memory controller 1020 copies contents of the first physical address of each logical address LA to a section of the second physical address for all the logical addresses LA of the address conversion table 1031. As a result, these second physical addresses indicate storage destinations of the first generation snapshot data. The memory controller 1020 sets a generation 1 of the snapshot flag 1033 ON, and returns a generation number "1" to the host computer 1100.

FIG. 6C shows an internal status immediately after the write command (3) is executed. Upon reception of the snapshot acquisition command, the memory controller 1020 refers to the page status register 1032 to select two pages at Y2 and Y3 of status values=F (unwritten), and writes data C' and D' in the pages at Y2 and Y3. In the second physical address, a value of the first physical address by the snapshot acquisition command has been stored as a first generation snapshot.

Then, the memory controller 1020 detects storage of first generation snapshot data in X2 and X3 of sections of first physical addresses of the logical addresses LA=2 and 3 from a second physical address in the address conversion table 1031. Accordingly, the memory controller 1020 maintains page status values of the second physical addresses X2 and X3 at 0 (valid data). Then, the memory controller 1020 sets Y2 and Y3 corresponding to the data C' and D' written by the write command (3) in each first logical address corresponding to the logical addresses LA=2 and 3 of the address conversion table 1031, respectively, and sets pages status values of Y2 and Y3 of the page status register 1032 to 0 (valid data).

Upon reception of the snapshot acquisition command (4), the memory controller 1020 copies contents of the first physical address of each logical address LA to sections of third physical addresses for all the logical addresses LA of the address conversion table 1031. As a result, the third physical addresses indicate storage destinations of second generation snapshot data. Then, the memory controller 1020 sets a generation 2 of the snapshot flag 1033 ON, and returns a generation number=2 to the host computer 1100.

Upon reception of the write command (5), the memory controller 1020 refers to the page status register 1032 to select a page at Z0 of a status value=F (unwritten), and writes the data D" in the page at Z0. Then, the memory controller 1020 refers to the address conversion table 1031 to detect storage of second generation snapshot data in Y3 of the section of the first physical address of the logical address LA=3 form presence of Y3 in the third logical address LA=3. Accordingly, the memory controller 1020 maintains a page status value of Y3 of the page status register 1033 at 0 (valid data). Then, the memory controller 1020 sets Z0 in the first physical address of the logical address LA=3 of the address conversion table 1031, and sets a page status value of Z0 of the page status register 1032 to 0 (valid data). FIG. 6D shows an internal status immediately after execution of the write command (5). In FIG. 6D, in the third physical address, a page of the second generation snapshot written by the snapshot acquisition command (4) is stored, and a second generation is set ON in the snapshot flag 1033.

When a total number of data unwritten pages is equal to or less than a predetermined value (e.g., 3), by taking this as an opportunity, the memory controller 1020 carries out the following clean-up process to increase the total number of unwritten pages.

First, the memory controller 1020 refers to the page status register 1032 to select a block X 2000 which includes most pages of page status values=8 (invalid data), retrieves pages storing data to be saved in the block X 2000 from the address conversion table 1031, and detects two pages at X2 and X3 of page status values=0 from the second physical address. Then, the memory controller 1020 copies stored data C and D of the pages at X2 and X3 to pages at Z1 and Z2 of page status values=F (unwritten), respectively, sets page status values of Z1 and Z2 to 0 (valid data), and sets page status values of X2 and X3 to 8 (invalid data).

Then, the memory controller 1020 retrieves two sections where X2 and X3 are set in the address conversion table 1031, and sets pages at Z1 and Z2 of the data C and D moved to the section of the second physical address.

Accordingly, the stored data of the block X 2000 to be saved is saved in another block, and a status where invalid data are stored in all the pages is set. FIG. 6E shows an internal status at a point of time when data migration by the block clean-up process is completed.

Then, the memory controller 1020 deletes contents of a block X where all are invalid data to set a page status value of the block X=FFFF. FIG. 7A shows an internal status at a point of time when the block clean-up process is completed. According to the block clean-up process described above, the total number of pages in which data is unwritten increase to 5 from 3 shown in FIG. 6D.

Upon reception of the read data selection command (6) of the first generation snapshot, the memory controller 1020 sets a type value=1 in the read data selection register.

Upon reception of the read command (7) for the logical addresses LA=0 to 3, the memory controller 1020 detects pages at Y0, Y1, Z1, and Z2 of the second PA indicating first generation snapshots corresponding to the logical addresses LA=0 to 3 in the address conversion table 1031, and reads data A', B', C, and D stored in these pages to transmit the data to the host computer 1100, respectively. These are snapshots of data stored in the logical addresses LA=0 to 3 at the time of FIG. 6B.

Upon reception of the read data selection command (8) for selecting the second generation snapshot, the memory controller 1020 sets a type value=2 in the read selection register.

Upon reception of the read command (9) for the logical addresses LA=0 to 3, the memory controller 1020 detects pages at Y0 to Y3 of third physical addresses corresponding to the second generation snapshots of the logical addresses LA=0 to 3 in the address conversion table 1031 because of type value=2 set in the read data selection register, and reads data A', B', C', and D' stored in these pages to transmit the data to the host computer 1100, respectively. These are snapshots of the data stored in the logical addresses at the time of FIG. 6C.

Upon reception of the read data selection command (10) for selecting latest data, the memory controller 1020 sets a type value=0 in the read data selection register.

Upon reception of the read command (11) for the logical addresses LA=0 to 3, the memory controller 1020 detects pages at Y0, Y1, Y2, and Z0 of the first PA corresponding to latest data of the logical addressees LA=0 to 3 in the address conversion table 1031 because of the type value=0 set in the read selection register, and reads data A', B', C', and D' stored in the pages to transmit the data to the host computer 1100, respectively. These are latest data stored in the logical addresses.

FIG. 7B shows an internal status immediately after execution of the snapshot release command (12) for releasing the second generation snapshot. Upon reception of the snapshot release command (12), to detect pages for storing second generation snapshot data, the memory controller 1020 obtains pages at Y0 to Y3 of the third physical address corresponding to the second generation snapshots of the logical addresses LA=0 to 3 in the address conversion table 1031, respectively, from the status shown in FIG. 7A. The pages of the third physical address except the page at Y3 are registered in both the first and second physical addresses, and store latest or first generation snapshot data, and thus the pages are not invalidated. Accordingly, the memory controller 1020 sets a page status of Y3 of the page status register 1032 to 8 (invalid data) to invalidate only Y3. Then, the memory controller 1020 clears the section of the third physical address for all the logical addresses LA of the address conversion table 1031. Lastly, the memory controller 1020 sets a generation=2 of the snapshot flag 1033 OFF.

FIG. 7C shows an internal status immediately after execution of the write command (13) for writing a data C" in the logical address LA=2. Upon reception of the write command (13), the memory controller 1020 refers to the page status register 1032 to select a page at Z3 of a page status value=F (unwritten), and writes a data C" therein. Then, the memory controller 1020 searches the address conversion table 1031 to detect that Y2 (refer to FIG. 7B) existent in the section of the first physical address of the logical address LA=2 stores no snapshot data of any generation. Accordingly, the memory controller 1020 sets a page status value of Y2 of the page status register 1032 to 8 (invalid data). Then, Z3 is set in the first physical address of the logical address LA=2 of the address conversion table 1031, and a page status value of Z3 is set to 0 (valid data).

FIG. 7D shows an internal status immediately after execution of the snapshot release command (14) for releasing the first generation snapshot. Upon reception of the snapshot release command (14), to detect pages for storing first generation snapshot data, the memory controller 1020 detects pages at Y0, Y1, Z1, and Z2 of the second physical address of the logical addresses LA=0 to 3 in the address conversion table 1031, respectively. The pages at Y0 and Y1 are registered in the first physical address, and the first physical address stores latest data, and thus the pages are not invalidated. Accordingly, the memory controller 1020 sets a page status of the pages at Z1 and Z2 of the page status register 1032 to 8 (invalid data) to invalidate the pages at Z1 and Z2 of the second physical address. Then, the memory controller 1020 clears the section of the second physical address for all the logical addresses LA of the address conversion table 1031. Lastly, the memory controller 1020 sets a generation=1 of the snapshot flag 1033 OFF.

FIG. 7E shows an internal status immediately after execution of the write command (15) for writing a data D' in the logical address LA=3. Upon reception of the write command (15), the memory controller 1020 refers to the page status register 1032 to select a page at X0 of a page status value=F (unwritten), and writes a data D''' in the page at X0. Then, the memory controller 1020 refers to the address conversion table 1031 to detect that the page at Z0 of the logical address LA=3 stores no snapshot data of any generation (status shown in FIG. 7D). Accordingly, the memory controller 1020 sets a page status value of the page at Z0 of the page status register 1032 to 8 (invalid data). Then, the page at X0 is set in the first physical address of the logical address LA=1 of the address conversion table 1031, and a page status value of the page at X0 is set to 0 (valid data).

Figure 8:
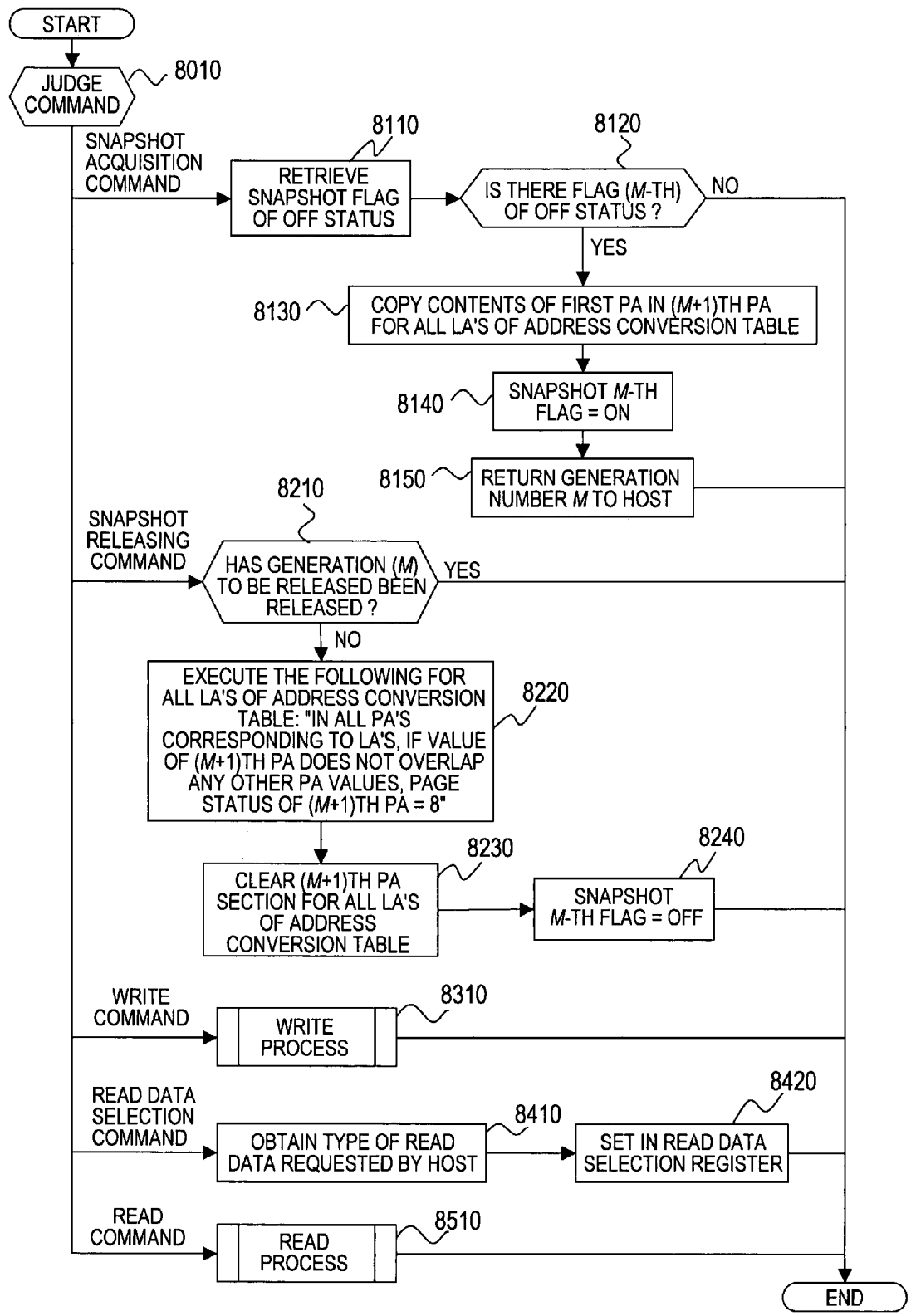
FIG. 8 is a flowchart showing a processing procedure executed by a memory controller for a command received from a host computer according to the second embodiment of this invention.

FIG. 8 is a flowchart showing a processing procedure executed by the memory controller 1020 for a command received from the host computer 1100. The procedure will be described below.

First, the memory controller 1020 judges a type of a received command (8010).

If a result of the command is a snapshot acquisition command, the memory controller 1020 retrieves an entry of an OFF status in the snapshot flag 1033 (8110). In step 8120, if there is no flag of an OFF status, judging that a permissible number of snapshot times is exceeded, an error of an acquisition failure is returned to the host computer 1100 to finish the command process.

On the other hand, if there is a flag (M-th) of an OFF status, contents of a first physical address is copied to a section of a (M+1)th physical address for all the logical addresses LA of the address conversion table 1031 (8130). Then, a generation M of the snapshot flag 1033 is set ON (8140), and a generation number M allocated to a currently obtained snapshot is returned to the host computer 1100 (8150) to finish the command processing.

If a result of the command judgment of the step 8010 is a snapshot release command, a generation number (Ad) to be released by the host computer 1100 is extracted from a parameter (type value) added to the command. If the generation M of the snapshot flag 1033 is set OFF in a step 8210 (i.e., has been released), an error of a release failure is returned to the host computer 1100 to finish the command process. On the other hand, if the generation M of the snapshot flag 1033 is set ON, the following process is carried out for all the logical addresses LA of the address conversion table 1031 (8220).

The memory controller 1020 "sets a page status of a (M+1)th physical address to 8 (invalid data) in the page status register 1032 if a value of the (M+1)th physical address does not overlap a value of any other physical address in all the physical addresses corresponding to each logical address LA".

Then, the section of the (M+1)th physical address is cleared for all the logical addresses LA of the address conversion table 1031 (8230). Lastly, the generation M of the snapshot flag 1033 is set OFF (8240) to finish the command process.

If a result of the command judgment of the step 8010 is a write command, a write step 8310 (refer to FIG. 9A for details) is executed to finish the command process.

If a result of the command judgment of the step 8010 is a read data selection command, a type of read data (one of latest and first to third generation snapshots) requested by the host computer 1100 based on the read command is obtained from a parameter (type value) added to the command (8410). Then, a type value for identifying the type is set in the read data selection register (8420) to finish the command process.

If a result of the command judgment of the step 8010 is a read command, a read step 8510 (refer to FIG. 9B for details) is executed to finish the command process.

Figure 9A:
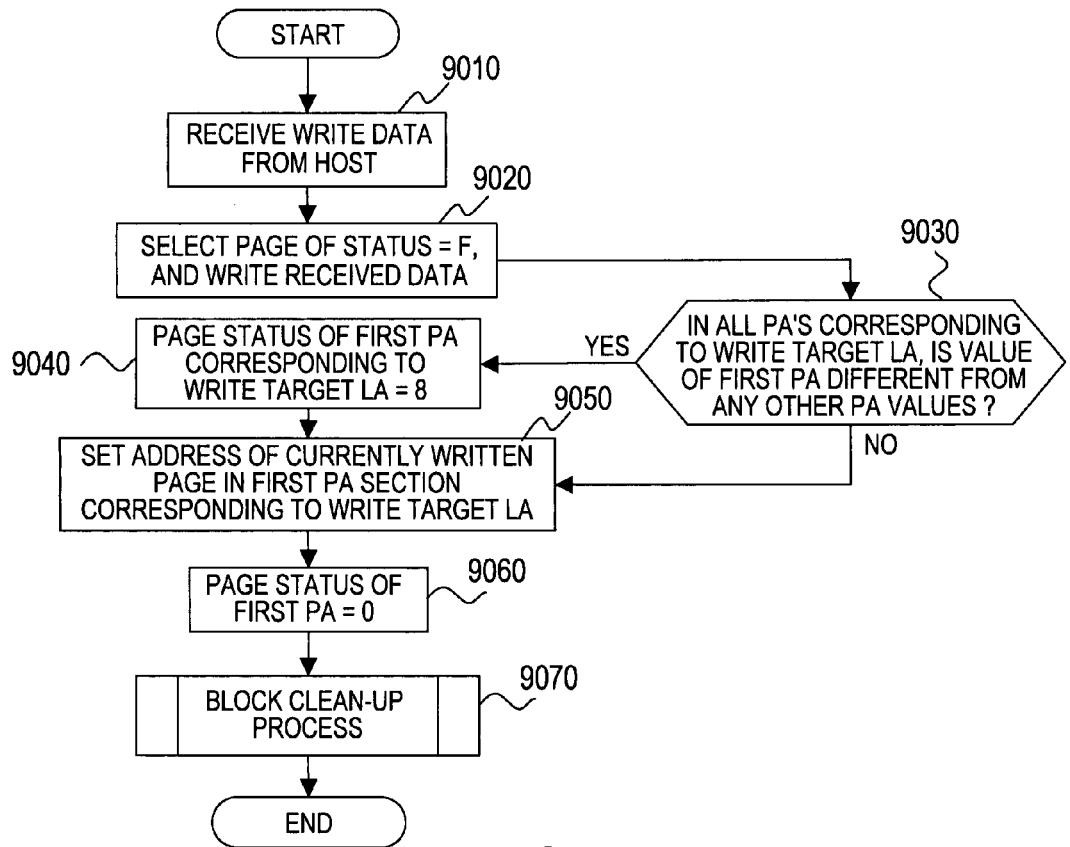
FIG. 9 is a flowchart showing a writing process and a reading process executed by the memory controller according to the second embodiment of this invention.

FIG. 9A is a flowchart showing a processing procedure executed by the write step 8310 of FIG. 8. The procedure will be described below.

First, write data is received from the host computer 1100 (9010), a page of a page status value=F is selected in the page status register 1032, and the received data is written in the page (9020).

Then, all physical addresses corresponding to a logical address designated by the write command are detected in the address conversion table 1031, and whether a value of a first physical address (address of a page storing data before updating) is different from values of any other physical addresses (whether the value is not snapshot data) is retrieved (9030). If a result of the retrieval is "no" (overlaps), the process proceeds to step 9050. On the other hand, if a result of the retrieval is "yes" (does not overlap), in the page status register 1032, a page status of the first physical address corresponding to the designated logical address is set to 8 (invalid data) (9040). In the address conversion table 1031, an address (address of a page storing data after updating) of a page written in the section of the first physical address corresponding to the designated logical address in the step 9020 is set (9050). In the page status register 1032, a page status of a page indicated by the new first physical address is set to 0 (valid data). Lastly, a block clean-up step 9070 (refer to FIG. 10 for details) is executed.

Figure 9B:
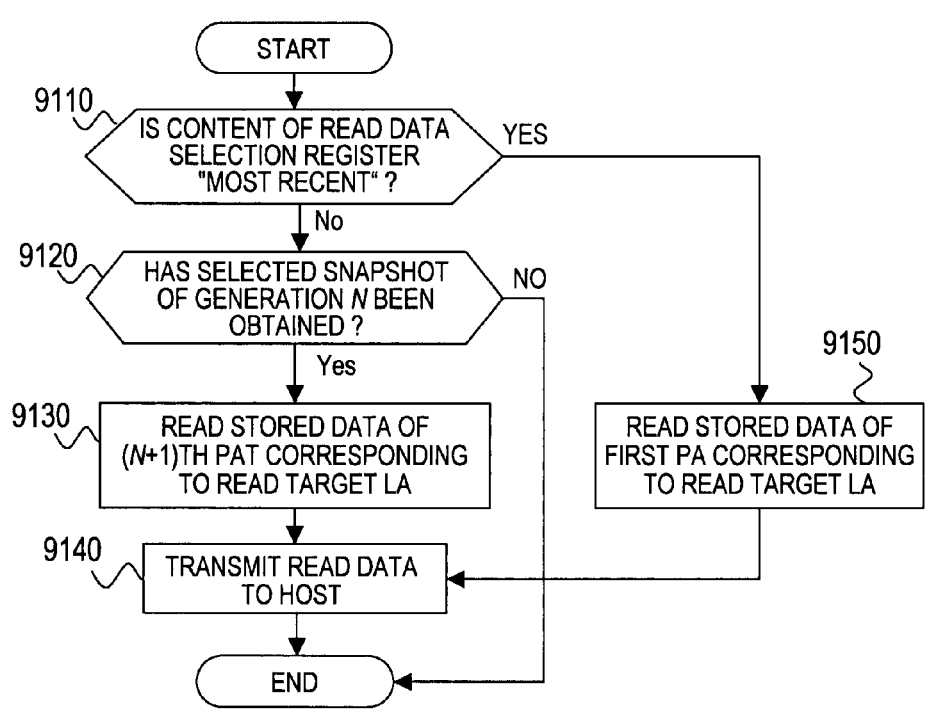

FIG. 9B is a flowchart showing a processing procedure executed in the read step 8510 by the memory controller 1020. The procedure will be described below.

First, whether a type value set in the read data selection register indicates "latest" (=0) is investigated (9110). If a result is "yes" (latest), in the address conversion table 1031, data stored in a first physical address corresponding to a logical address designated by the read command is read (9150), and the read data is transmitted to the host computer 1100 (9140). On the other hand, if a result is "no" (snapshot), for a selected generation number (N), whether a generation N of the snapshot flag 1033 is ON (whether a snapshot has been obtained) is investigated (9120). If the generation N of the snapshot flag 1033 is OFF, a read error is returned to the host computer 1100 to finish the read process. If the generation N of the snapshot flag 1033 is ON, data stored in a (n+1)th PA corresponding to the designated logical address is read (9130), and the read data is transmitted to the host computer 1100 (9140).

Figure 10:
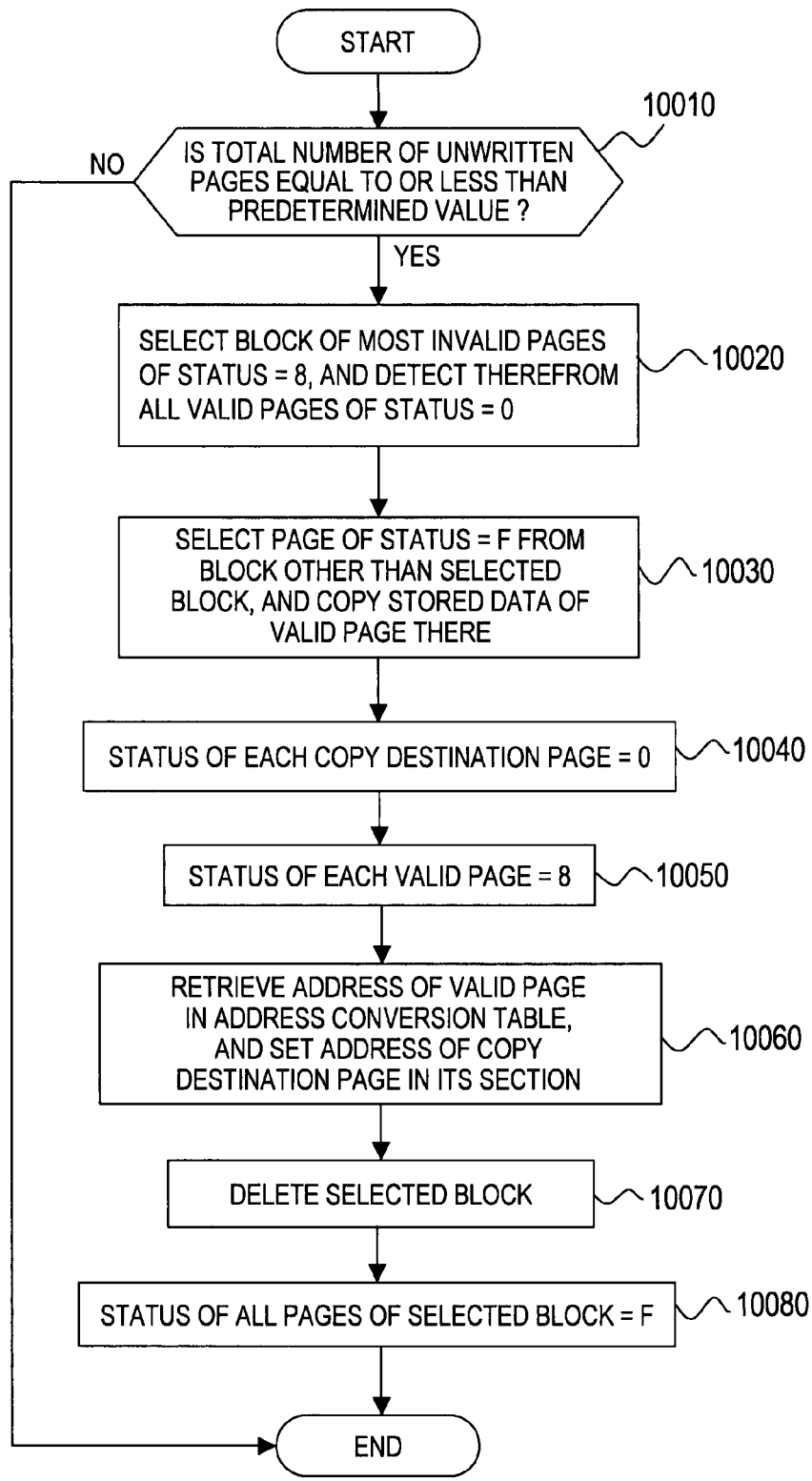
FIG. 10 is a flowchart showing a block clean-up process executed by the memory controller according to the second embodiment of this invention.

FIG. 10 is a flowchart showing a detailed processing procedure of the block clean-up step 9070 shown FIG. 9A. The procedure will be described below.

First, the memory controller 1020 refers to the page status register 1032 to judge whether the total number of pages of page status values=F (unwritten) is equal to or less than a predetermined value (10010). If a result of the judgment is "no" (larger than the predetermined value), no processing is executed to finish the process. On the other hand, if a result of the judgment is "yes" (equal to or less than the predetermined value), one block which includes most pages of page status values=8 (invalid data) is selected, and all valid pages of page status values=0 (valid data) in the block are detected (10020). The number of detected valid pages is indicated by P. P unwritten pages of page status values=F of a block other than the selected block are selected, and data stored in the valid pages detected in the step 10020 are copied (saved) to one of the unwritten pages (10030). Then, in the page status register 1032, a page status value of each copying destination page of the step 10030 is set to 0 (10040). All the page status values of the valid pages detected in the step 10020 are set to 8 (invalid data) (10050). Then, by retrieving addresses of the valid pages detected in the step 10020 from all the physical addresses set in the address conversion table 1031, sections where the addresses are set are specified, and the physical addresses of the copying destination pages of the step 10030 are copied to the specified sections (10060). Accordingly, all the pages of the block selected in the step 10020 are invalidated, and saving of page data which has been stored in the block to be saved is completed.

Then, the block selected in the step 10020 is deleted (10070). Page status values of all the pages of the block in the page status register 1032 are set to F (unwritten) (10080) to finish the process.

A detailed implementing method of the address conversion table 1031 will be described. The sections of the second to fourth physical addresses in the address conversion table 1031 are "unset" by releasing the snapshot. As in the case of the first embodiment, a unique value ("FFFFFFFF (hexadecimal number)) indicating "unset" may be defined, and this value may be written in the nonvolatile RAM 1030 to set an "unset" status. However, because the (N+1)th physical address can be judged to be in an "unset" status if a certain generation N of the snapshot flag 1033 has been released (OFF), it is not necessary to clarify the "unset" status in the address conversion table 1031, and written useless address values may be left as they are. In other words, the step 8230 of FIG. 8 may be omitted. In this case, however, the useless address values are excluded from retrieval targets in the address retrieval steps (8220 of FIG. 8, 9030 of FIG. 9A, and 10060 of FIG. 10) in the address conversion table 1031.

The above described is the second embodiment.

According to the first and second embodiments, the semiconductor memory system 1000 allocates a plurality of physical addresses to one logical address. Thus, when a great deal of data is written after the host computer 1100 obtains the snapshot, there is a possibility that a total capacity of the provided flash memory 1040 may not be sufficient for processing the number of free physical pages. In this case, the snapshot must be released to secure free physical pages (this processing is equivalent to execution of the normal operation start command of the first embodiment. This processing is referred to as snapshot releasing and to release a snapshot hereinafter). Thus, when it is judged that the total number of valid data storage pages (page of status=0 or 1) exceeds a predetermined upper limit value during command processing, an error meaning disk-capacity-over may be returned to allow the host computer 1100 to release the snapshot.

The semiconductor memory system 1000 may automatically release the snapshots by itself. In this case, for example, the oldest snapshot is preferentially released. The snapshot flag 1033 is extended to record sequence numbers during acquisition. Then, a snapshot having a smallest sequence number can be detected as an oldest snapshot.

A setting command may be newly defined to validate or invalidate this automatic releasing. In this case, the semiconductor memory system 1000 interprets the command to validate or invalidate the automatic releasing beforehand. Alternatively, a flag indicating "permit/inhibit" this automatic releasing may be added to the parameters of the snapshot acquisition command so that the host computer 1100 can individually permit automatic releasing beforehand. In this case, the semiconductor memory computer 1000 interprets the flag, and records information thereof in the (extended) snapshot flag 1033 beforehand. Subsequently, when automatic releasing is necessary, the record is referred to, and an oldest snapshot among the snapshots of "permit" is preferentially released.

For an opportunity used by the semiconductor memory computer 1000 to automatically release the snapshots by itself, not only the capacity shortage as described above but also various events detected by the semiconductor memory computer 1000 may be applied. For example, the semiconductor memory computer 1000 may include a unit for acquiring current time, and the acquired current time is recorded in the (extended) snapshot flag 1033 in the case of snapshot acquisition. When a difference between the current time and acquisition time exceeds a predetermined value (e.g., 3 years), the snapshot is automatically released.

Not only the semiconductor memory computer 1000 releases the snapshot automatically itself, but also may automatically acquire a snapshot (this processing is equivalent to execution of the snapshot command process of the first embodiment. This processing is referred to as snapshot acquisition and to acquire a snapshot hereinafter). For an opportunity for the execution, various events detected by the semiconductor memory computer may be applied.

For example, the semiconductor memory computer 1000 may include a unit for acquiring current time. When predetermined time arrives, the snapshot acquisition is automatically executed. A command for setting the predetermined time may be newly defined. In other words, the semiconductor memory computer 1000 interprets the command to register the predetermined time therein (e.g., nonvolatile RAM 1030) beforehand.

As another example, a semiconductor memory computer 1000 may include an auxiliary power source (large-capacity capacitor) to prevent stored data destruction caused by power cutoff of the host computer 1100. The semiconductor memory computer 1000 detects use of the auxiliary power source to record a total number of use times or total use time in the nonvolatile RAM 1030. When a predetermined upper value is exceeded, snapshot acquisition is automatically executed judging deterioration of an external power environment.

As yet another example, when a total, an average, or a maximum value of the number of block deletion times of the flash memory 1040 exceeds a predetermined upper limit value, or a total of the number of writing or deleting errors of the flash memory 1040 exceeds a predetermined upper limit value, judging deterioration of reliability of the storage system, snapshot-acquisition may be automatically executed.

In the above description, command codes uniquely defined for a vendor in the conventional semiconductor memory computer should preferably be allocated to the newly defined commands such as the snapshot acquisition/release command and the read data selection command, and the same standard command code as that of the read/write command of the conventional semiconductor memory computer should preferably be allocated to the read/write command, thereby improving high-order compatibility of the storage system.

In the description, as the unit for returning various errors regarding the snapshot generation number or the snapshot function to the host computer 1100, the status read command generally provided in the conventional semiconductor memory computer may be extended to realize the unit. In other words, a generation number is buried in an unused part of status information read by the command. Error codes unused by the standard are allocated to various errors regarding the snapshot function, and the codes are set in error information parts of the status information.

For convenience of the host computer 1100, the upper limit value of the number of snapshot generations which can be obtained by the semiconductor memory computer 1100 of this invention or a list of obtained snapshot generation numbers may be buried in an unused part of the status information as in the above case.

According to the second embodiment described above, the memory controller 1020 receives a read command for a desired logical address after a snapshot generation or latest data is designated by the read data selection command. Alternatively, a type value may be added to the read command to designate a logical address and a type of data to be read by one command.

(Supplement)

A semiconductor memory computer, including:

a flash memory including a plurality of blocks that can be collectively deleted and a plurality of pages obtained by dividing each block into a plurality of areas to store data; and a memory controller for controlling one of writing and reading in the flash memory by the page units and batch deletion by the block units, in which:

the memory controller performs one of reading and writing data of a memory chip based on a logical address included in a request received from a host apparatus;

the memory controller includes:

a request judgment unit for judging which one of a latest data write request, a snapshot acquisition request, and a release request the received request is if the received request is a write request, and which of a read request of the latest data and a snapshot read request the received request is if the received request is a read request;

an address conversion unit for managing a physical address of the page corresponding to the logical address included in the request;

a page status setting unit for managing which of valid, invalid, and unwritten statuses stored data is for each page of each block;

a snapshot management unit for managing a snapshot generation upon reception of the snapshot acquisition request, the read request, or the release request;

an access destination deciding unit for referring to the address conversion unit, the status setting unit, and the snapshot management unit from the logical address included in the request judged by the request judgment unit to decide a physical address of a page to be accessed according to the request; and an access control unit for accessing the decided page according to the request;

the address conversion unit includes:

a first physical address group for storing a physical address of a page for storing the latest data for each logical address; and a second physical address group for storing a physical address of a page for storing the snapshot for each logical address; and the snapshot management unit sets validity or invalidity of the snapshot.

While the present invention has been described in detail and pictorially in the accompanying drawings, the present invention is not limited to such detail but covers various obvious modifications and equivalent arrangements, which fall within the purview of the appended claims.

What is claimed is:

1. A semiconductor memory system, comprising:
a flash memory including a plurality of memory chips each including a plurality of blocks that can be collectively deleted and a plurality of pages obtained by dividing each block into a plurality of areas to store data; and
a memory controller configured to control one of writing to and reading from the memory chips on a page basis and control batch deletion on a block basis, said memory controller further configured to:
perform one of reading from and writing to a memory chip based on a logical address included in a request received from a host apparatus;
manage a table for at least two physical addresses related to each logical address on a page basis, a status of each page, and a snapshot flag;
if a first physical address of a first page is related to a logical address in the table, and the memory controller receives a write request to the logical address from the host apparatus:
store data into a second page;
set the status of the first page as invalid, if the snapshot flag is off;
set the status of the first page as non-latest and maintain the relationship between the first physical address and the logical address in the table, if the snapshot flag is on;
relate a second physical address of the second page to the logical address in the table; and
set the status of the second page as valid;
provide data stored in a page having a valid status corresponding to a physical address related to a logical address included in a read request received from the host apparatus; and
provide data stored in a page having a non-latest status corresponding to a physical address related to a logical address included in a recovery read request received from the host apparatus.

2. The semiconductor memory system according to claim 1, wherein, if the memory controller receives a snapshot release request from the host apparatus, the memory controller is further configured to reset the snapshot flag as off.

3. The semiconductor memory system according to claim 1, wherein the memory controller is further configured to
monitor whether a number of unwritten pages of flash memory is less than a preset value;
delete a block having the most invalid pages collectively from a plurality of blocks; and
set status of each page in the deleted block as unwritten.

4. The semiconductor memory system according to claim 1, wherein if the memory controller receives a snapshot acquisition request from the host apparatus, the memory controller is further configured to set the snapshot flag as on.

5. The semiconductor memory system according to claim 1, wherein if the memory controller judges that a remaining life of the flash memory is short based on a number of deletion times of each block of the flash memory, the memory controller is further configured to set the snapshot flag as on.

6. The semiconductor memory system according to claim 1, wherein the memory controller is further configured to store acquisition time with the snapshot flag when the memory controller sets the snapshot flag as on.

7. The semiconductor memory system according to claim 6, wherein the memory controller is further configured to, if a difference between a current time and the acquisition time exceeds a predetermined time, reset the snapshot flag as off.

8. The semiconductor memory system according to claim 1, wherein the memory controller is further configured to
monitor whether a number of unwritten pages in the flash memory is less than a preset value;
delete a block having a fewer number of deletion times collectively from a plurality of blocks; and
set status of each page in the deleted block as unwritten.

9. The semiconductor memory system according to claim 1, wherein the memory controller is further configured to manage a plurality of physical addresses related to each logical address based on a number of snapshot generations.

10. A method for controlling a flash memory that includes a plurality of memory chips each including a plurality of blocks that can be collectively deleted and a plurality of pages obtained by dividing each block into a plurality of areas to store data, the method, comprising:
performing one of reading from and writing to a memory chip based on a logical address included in a request received from a host apparatus;
managing a table for at least two physical addresses related to each logical address on a page basis, a status of each page, and a snapshot flag;
if a first physical address of a first page is related to a logical address in the table, and a write request to the logical address is received from the host apparatus:
storing data into a second page;
setting the status of the first page as invalid, if the snapshot flag is off;
setting the status of the first page as non-latest and maintain the relationship between the first physical address and the logical address in the table, if the snapshot flag is on;
relating a second physical address of the second page to the to the logical address in the table; and
setting the status of the second page as valid;
providing data stored in a page having a valid status corresponding to a physical address related to a logical address included a read request received from the host apparatus; and
providing data stored in a page having a non-latest status corresponding to a physical address related to a logical address included in a recovery read request received from the host apparatus.

11. The method according to claim 10, further comprising, if a snapshot release request is received from the host apparatus, resetting the snapshot flag as off.

12. The method according to claim 10, further comprising:
monitoring whether a number of unwritten pages in the flash memory is less than a preset value;
deleting a block having the most invalid pages collectively from a plurality of blocks and
setting status of each page in the deleted block as unwritten.

13. The method according to claim 10, further comprising, if a snapshot acquisition request is received from the host apparatus, setting the snapshot flag as on.

14. The method according to claim 10, further comprising, if it is judged that a remaining life of the flash memory is short based on a number of deletion times of each block of the flash memory, setting the snapshot flag as on.

15. The method according to claim 10, further comprising storing acquisition time with the snapshot flag when setting the snapshot flag as on.

16. The method according to claim 15, further comprising, if a difference between a current time and the acquisition time exceeds a predetermined time, resetting the snapshot flag as off.

17. The method according to claim 10, further comprising:
monitoring whether a number of unwritten pages in the flash memory is less than a preset value;
deleting a block having a fewer number of deletion times collectively from a plurality of blocks; and
setting status of each page in the deleted block as unwritten.

18. The method according to claim 10, further comprising managing a plurality of physical addresses related to each logical address based on a number of snapshot generations.

* * * * *